United States Patent
Noguchi et al.

(10) Patent No.: US 6,780,503 B2
(45) Date of Patent: Aug. 24, 2004

(54) MAGNETIC RECORDING MEDIUM

(75) Inventors: Hitoshi Noguchi, Odawara (JP); Nobuo Yamazaki, Odawara (JP); Shinji Saito, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/281,947

(22) Filed: Oct. 29, 2002

(65) Prior Publication Data

US 2003/0118870 A1 Jun. 26, 2003

(30) Foreign Application Priority Data

Oct. 29, 2001 (JP) ...................................... P. 2001-330576

(51) Int. Cl.$^7$ ............................................... G11B 5/702
(52) U.S. Cl. ................ 428/327; 428/328; 428/674 BN; 428/694 BH; 428/694 BU; 428/425.9
(58) Field of Search .............................. 428/425.9, 327, 428/378, 694 BN, 694 BH

(56) References Cited

FOREIGN PATENT DOCUMENTS

JP          2000-173038         6/2000

*Primary Examiner*—Stevan A. Resan
(74) *Attorney, Agent, or Firm*—Sughrue Mion, PLLC

(57) ABSTRACT

A magnetic recording medium comprising: a nonmagnetic support; and at least one magnetic layer comprising a ferromagnetic hexagonal ferrite powder and a binder, wherein the magnetic layer comprises diamond particles having an average particle size of 0.03 to 0.5 μm in a ratio of 0.1 to 5% by weight to the ferromagnetic hexagonal ferrite powder, the ferrite hexagonal ferrite powder has an average tabular diameter of 5 to 40 nm, and the binder is at least one of: (i) a binder comprising from 0.2 to 0.7 meq/g of at least one polar group selected from —$SO_3M$, —$OSO_3M$, —$PO(OM)_2$, —$OPO(OM)_2$ and —COOM, wherein M represents a hydrogen atom, an alkali metal or ammonium, and (ii) a binder comprising from 0.5 to 5 meq/g of at least one polar group selected from —$CONR_1R_2$, —$NR_1R_2$ and —$N^+R_1R_2R_3$ wherein $R_1$, $R_2$ and $R_3$ each independently represents a hydrogen atom or an alkyl group.

9 Claims, 1 Drawing Sheet

FIGURE
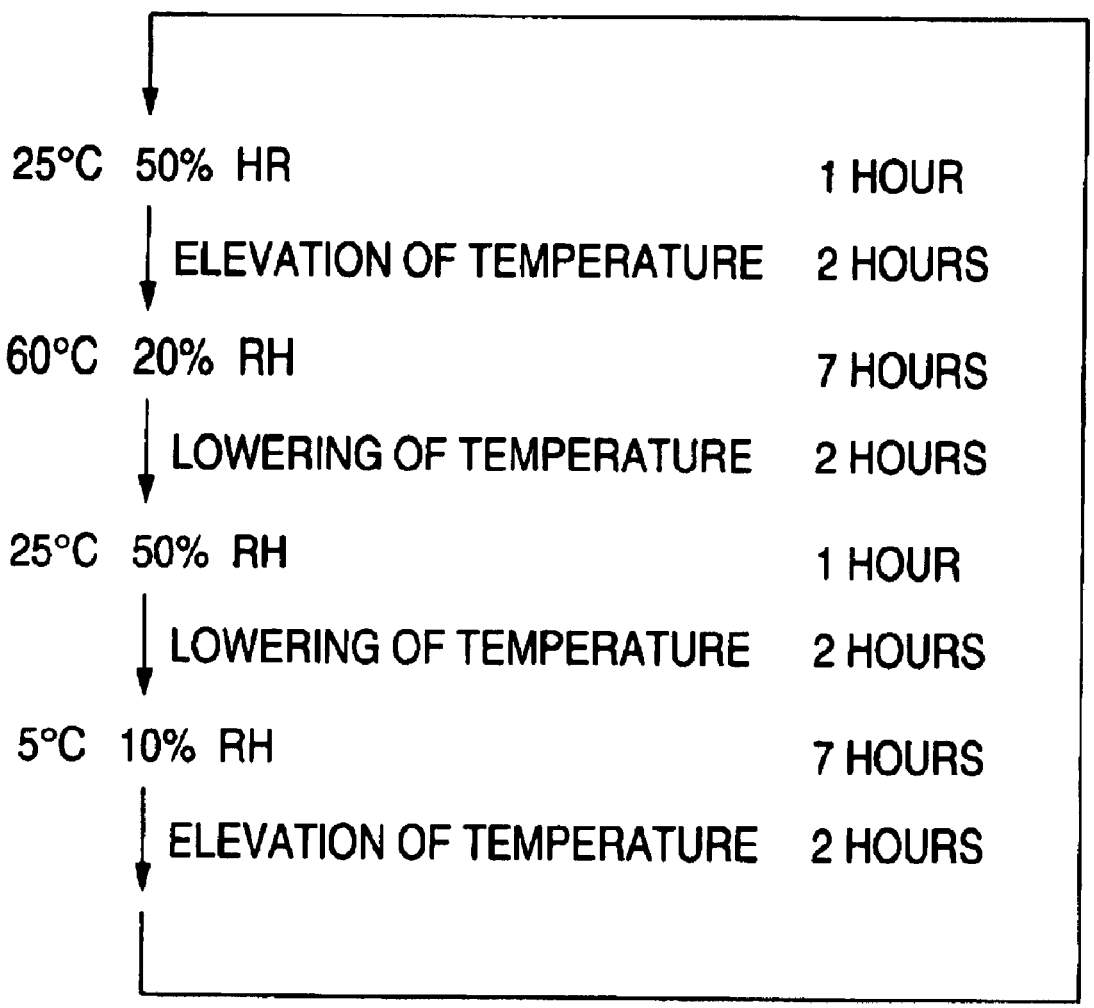

MAGNETIC RECORDING MEDIUM

FIELD OF THE INVENTION

The present invention relates to a magnetic recording medium, more specifically, the present invention relates to a magnetic recording medium for high-density recording, having a thin magnetic layer and having very excellent electromagnetic conversion characteristics and running durability.

BACKGROUND OF THE INVENTION

The magnetic recording medium widely used as a magnetic recording medium for computers (e.g., disc, tape) is obtained by providing a magnetic layer comprising a binder having dispersed therein ferromagnetic powder particles on a nonmagnetic support. Recently, in the field of magnetic recording, digital recording is practically taking the place of conventional analog recording because of its less deterioration of recording. In the digital recording, a large number of signals must be generally recorded and moreover, the recording/reproducing apparatus and the recording medium used therefor are demanded to ensure high image quality and high sound quality and at the same time, realize downsizing and space saving. To cope with these requirements, still higher density recording is demanded.

For achieving higher density recording, recording signal with a short wavelength and recording locus in a narrow track are employed. As for the recording medium, more improvement in the electromagnetic conversion characteristics is demanded and for this purpose, various proposals have been proposed, such as improvement in the magnetic characteristics of ferromagnetic powder, formation of fine particles, high filling, or ultra-smoothing of the medium surface. These are, however, not satisfactory for the higher density recording demanded in recent years.

When the recording wavelength is shortened, if the magnetic layer thickness is large, the self demagnetization loss at the time of recording and the thickness loss at the time of reproduction come out to serious problems. In order to avoid the saturation of reproducing head, the magnetic layer is rendered thinner, however, if the thickness of the magnetic layer is reduced to about 0.1 μm or less, the effect of nonmagnetic support is liable to appear on the magnetic layer surface and the reduction of electromagnetic characteristics and the error rate are liable to increase. Therefore, it is important to reduce the size of the magnetic powder so as to reduce noises and improve the electromagnetic conversion characteristics. For this purpose, a ferromagnetic hexagonal ferrite fine powder having a tabular diameter (plate size) of 40 nm or less is being used. However, such a fine particulate ferromagnetic powder readily undergoes aggregation and therefore, good dispersion of the powder is very difficult to attain as compared with conventional ferromagnetic fine powder having a relatively large size.

When the thickness of the magnetic layer is reduced, the running durability becomes a problem. JP-A-11-86273 (the term "JP-A" as used herein means an "unexamined published Japanese patent application") describes a magnetic recording medium where diamond particles having an average particle size of 0.10 to 1.0 μm are contained in the magnetic layer in an amount of 0.01 to 5% by weight (mass %) based on the ferromagnetic powder and thereby, high electromagnetic conversion characteristics and high durability both are attained. However, when use of an MR head becomes inevitable with the progress of higher density recording, the above-described method is disadvantageous in that diamond in the magnetic layer falls off and accelerates the abrasion of MR head.

SUMMARY OF THE INVENTION

The object of the present invention is to provide a magnetic recording medium optimal for digital recording, which has good dispersion of magnetic powder, excellent electromagnetic conversion characteristics and high running durability.

As a result of extensive investigations to achieve the above-described object, the present inventors have found that when a specific amount of fine diamond particles are used as an abrasive, a ferromagnetic hexagonal ferrite powder having a specific tabular diameter is used as the magnetic particle and a binder containing a specific polar group in a predetermined amount is used, the dispersibility of fine particulate magnetic powder is improved and a magnetic recording medium having excellent electromagnetic conversion characteristics and high running durability can be obtained. The present invention has been accomplished based on this finding.

The object of the present invention can be attained by a magnetic recording medium having the following constitution.

1. A magnetic recording medium comprising a nonmagnetic support having thereon at least one magnetic layer containing a ferromagnetic hexagonal ferrite powder and a binder, wherein
   (1) the magnetic layer contains diamond particles having an average particle size of 0.03 to 0.5 μm in a ratio of 0.1 to 5% by weight to the ferromagnetic hexagonal ferrite powder,
   (2) the ferrite hexagonal ferrite powder contained in the magnetic layer has an average tabular diameter of 5 to 40 nm, and
   (3) the binder contained in the magnetic layer is at least either one of:
   (i) a binder containing from 0.2 to 0.7 meq/g of at least one polar group selected from $-SO_3M$, $-OSO_3M$, $-PO(OM)_2$, $-OPO(OM)_2$ and $-COOM$ (wherein M represents a hydrogen atom, an alkali metal or ammonium), and
   (ii) a binder containing from 0.5 to 5 meq/g of at least one polar group selected from $-CONR_1R_2$, $-NR_1R_2$ and $-N^+R_1R_2R_3$ (wherein $R_1$, $R_2$ and $R_3$ each independently represents a hydrogen atom or an alkyl group).

Preferred embodiments of the present invention are as follows.

2. The magnetic recording medium as described in 1 above, wherein the binder is Polyurethane Resin (A) obtained by reacting an organic diisocyanate, a polyol having a cyclic structure and an alkylene oxide chain and having a molecular weight of 500 to 5,000, and as a chain extender, a polyol having a cyclic structure and having a molecular weight of 200 to 500.

3. The magnetic recording medium as described in 1 above, wherein the binder is Polyurethane Resin (B) obtained by reacting an organic diisocyanate compound, a polyester polyol comprising an aliphatic dibasic acid and an aliphatic diol having no cyclic structure and having an alkyl branched side chain, and as a chain extender, an aliphatic diol having a branched alkyl side chain having 3 or more carbon atoms.

4. The magnetic recording medium as described in 1 above, wherein the binder is Polyurethane Resin (C)

obtained by reacting an organic diisocyanate and a polyol compound having a cyclic structure and an alkyl chain having 2 or more carbon atoms.

5. The magnetic recording medium as described in 1 above, wherein the binder is a vinyl chloride-base copolymer containing at least 75 to 95% by weight of a vinyl chloride monomer unit.

6. The magnetic recording medium as described above, wherein the binder is an acrylic copolymer comprising from 1 to 75% by weight of a nitrogen-containing radical polymerizable monomer unit, from 1 to 75% by weight of an aromatic ring-containing radical polymerizable monomer unit, and another radical polymerizable monomer unit in an amount of making a total of 100% by weight.

7. The magnetic recording medium as descried in any one of 1 to 6 above, which is used for MR head reproduction.

For attaining a high capacity of a magnetic recording medium, the increase of track density is indispensable and the narrow track width requires use of an MR head. The MR head is high sensitive but susceptible to medium noises. The noises are ascribable to the non-uniformity in the dispersion state of magnetic powder. In order to reduce the non-uniformity in the dispersion state of magnetic powder, it is effective to perform the dispersion using a binder containing the above-described polar group in the above-described amount as in the present invention and use diamond capable of greatly improving the magnetic layer strength by the addition in a small amount.

Conventional binders induce the falling of diamond and this gives rise to deterioration of durability and reduction of output due to abrasion of the MR head. In the present invention, diamond having a specific size is dispersed in a specific amount using a binder having a specific polar group and this is effective to prevent the falling of diamond, improve the durability and inhibit the abrasion of head.

BRIEF DESCRIPTION OF THE DRAWING

FIG. 1 is an explanatory view showing the thermo-cycle flow in the evaluation of running durability.

DETAILED DESCRIPTION OF THE INVENTION

The magnetic recording medium of the present invention is described in detail below.

In the present invention, a fine particulate ferromagnetic powder, namely, a hexagonal ferrite powder having an average tabular diameter of 5 to 40 nm is used for the magnetic layer, whereby reduction of noises can be realized. However, such a very fine particulate magnetic powder is inferior in the dispersibility and dispersion stability and therefore, good dispersion cannot be attained by a conventional binder even if it contains approximately from 0.01 to 0.1 meq/g of a polar group (see, for example, JP-B-58-41565 (the term "JP-B" as used herein means an "examined Japanese patent publication")). In the present invention, the polar group content is increased as compared with conventionally used binders, whereby dispersibility of the fine particulate magnetic powder can be enhanced and a magnetic recording medium excellent in the electromagnetic conversion characteristics can be obtained.
[Binder]

The binder for use in at least one or more magnetic layer of the present invention is at least either one binder of:
(i) a binder containing from 0.2 to 0.7 meq/g of at least one polar group selected from $-SO_3M$, $-OSO_3M$, $-PO(OM)_2$, $-OPO(OM)_2$ and $-COOM$ (wherein M represents a hydrogen atom, an alkali metal or ammonium), and
(ii) a binder containing from 0.5 to 5 meq/g of at least one polar group selected from $-CONR_1R_2$, $-NR_1R_2$ and $-N^+R_1R_2R_3$ (wherein $R_1$, $R_2$ and $R_3$ each independently represents a hydrogen atom or an alkyl group). That is, the binder (i) or (ii) is used and these two binders may also be used in combination.

The alkyl group is preferably an alkyl group having from 1 to 18 carbon atoms and may have a linear or branched structure.

In the binder (i), the polar group content is from 0.2 to 0.7 meq/g, preferably from 0.25 to 0.6 meq/g, more preferably from 0.3 to 0.5 meq/g.

In the binder (ii), the polar group content is from 0.5 to 5 meq/g, preferably from 1 to 4 meq/g, more preferably from 1.5 to 3.5 meq/g.

If the polar group content is out of the above-described range, good dispersion of fine particulate magnetic powder cannot be attained.
[Polyurethane Resin]

In the present invention, a polyurethane resin can be used as the binder. Examples of the polyurethane resin used include:

(1) Polyurethane Resin (A) obtained by reacting an organic diisocyanate, a polyol having a cyclic structure and an alkylene oxide chain and having a molecular weight of 500 to 5,000, and as a chain extender, a polyol having a cyclic structure and having a molecular weight of 200 to 500, which belongs to at least either one of the binders (i) and (ii), (2) Polyurethane Resin (B) obtained by reacting an organic diisocyanate compound, a polyester polyol comprising an aliphatic dibasic acid and an aliphatic diol having no cyclic structure and having an alkyl branched side chain, and as a chain extender, an aliphatic diol having a branched alkyl side chain having 3 or more carbon atoms, which belongs to at least either one of the binders (i) and (ii), and (3) Polyurethane Resin (C) obtained by reacting an organic diisocyanate and a polyol compound having a cyclic structure and an alkyl chain having 2 or more carbon atoms, which belongs to at least either one of the binders (i) and (ii).

(Polyurethane Resin (A))

As the polyol having a cyclic structure and an alkylene oxide chain, which is a starting material of Polyurethane Resin (A), those obtained by adding an alkylene oxide such as ethylene oxide or propylene oxide to a diol having a cyclic structure can be used. Specific examples thereof include diols such as bisphenol A, hydrogenated bisphenol A, bisphenol S, hydrogenated bisphenol S, bisphenol P, hydrogenated bisphenol P, tricyclodecane dimethanol, cyclohexane dimethanol, cyclohexane diol, 5,5'-(1-methylethylidene)bis-(1,1'-bicyclohexyl)-2-ol, 4,4'-(1-methylethylidene)bis-2-methylcyclohexanol, 5,5'-(1,1'-cyclohexylidene)bis-(1,1'-bicyclohexyl)-2-ol, 5,5'-(1,1'-cyclohexylmethylene)bis-(1,1'-bicyclohexyl)-2-ol, hydrogenated terpene diphenol, diphenyl bisphenol A, diphenyl bisphenol S, diphenyl bisphenol P, 9,9-bis-(4-hydroxyphenyl)fluorene, 4,4'-(3-methylethylidene)bis(2-cyclohexyl-5-methylphenol), 4,4'-(3-methylethylidene)bis(2-phenyl-5-methylcyclohexanol), 4,4'-(1-phenylethylidene)bis(2-phenol), 4,4'-cyclohexylidene-bis(2-methylphenol) and terpene diphenol. Among these, preferred are hydrogenated bisphenol A and polypropylene oxide adduct of hydrogenated bisphenol A. The molecular weight of the polyol is preferably from 500 to 5,000. When the molecular weight is 500 or more, the urethane group concentration is low and therefore, the solvent solubility is high, and when the molecular weight is 5,000 or less, good coating strength and high durability can be advantageously attained.

As the polyol having a cyclic structure, which is used as a chain extender, the above-described diols having a cyclic structure and those obtained by adding thereto an alkylene oxide such as ethylene oxide or propylene oxide in the molecular weight range from 200 to 500 can be used. Among these, preferred are hydrogenated bisphenol A and a propylene oxide adduct of hydrogenated bisphenol A.

(Polyurethane Resin (B))

The polyester polyol as a starting material of Polyurethane Resin (B) comprises an aliphatic dibasic acid and an aliphatic diol having no cyclic structure and having an alkyl branched side chain. Examples of the aliphatic dibasic acid which can be used include aliphatic dibasic acids such as succinic acid, adipic acid, azelaic acid, sebacic acid, malonic acid, glutaric acid, pimeric acid and suberic acid. Among these, preferred are succinic acid, adipic acid and sebacic acid. Out of all dibasic acid components in the polyester polyol, the content of the aliphatic dibasic acid is preferably 70 mol % or more. When the aliphatic dibasic acid content is 70 mol % or more, the concentration of the dibasic acid having a cyclic structure is substantially low and therefore, a good effect of improving dispersibility can be obtained.

Examples of the aliphatic polyol having no cyclic structure and having an alkyl branched side chain, which can be used in the polyester polyol, include branched aliphatic diols such as 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol and 5-butyl-1,9-nonanediol. Among these, preferred are 2,2-dimethyl-1,3-propanediol, 2-ethyl-2-butyl-1,3-propanediol and 2,2-diethyl-1,3-propanediol. In the polyol used for the polyester polyol, the content of the polyol having a branched side chain is preferably from 50 to 100 mol %, more preferably from 70 to 100 mol %. Within this range, high solvent solubility and good dispersibility can be obtained.

In Polyurethane Resin (B), an aliphatic diol having a branched alkyl side chain having 3 or more carbon atoms can be used as a chain extender. By having 3 or more carbon atoms and having a branched alkyl side chain, the solvent solubility is improved and good dispersibility can be obtained.

Examples of the aliphatic diol having a branched alkyl side chain having 3 or more carbon atoms which can be used include 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol and 5-butyl-1,9-nonanediol. Among these, preferred are 2-ethyl-2-butyl-1,3-propanediol and 2,2-diethyl-1,3-propanediol. The content in the polyurethane resin is preferably from 5 to 30% by weight, more preferably from 10 to 20% by weight. Within this range, high solvent solubility and good dispersibility can be obtained.

(Polyurethane Resin (C))

The polyol compound having a cyclic structure and an alkyl chain having 2 or more carbon atoms, which is a starting material of Polyurethane Resin (C), is preferably a diol having a molecular weight of 500 to 1,000. When the polyol compound is a diol, gelation due to crosslinking at the polyurethane polymerization is advantageously not generated. Furthermore, when the alkyl chain of the diol has 2 or more carbon atoms, high solvent solubility and good dispersibility can be obtained. When the molecular weight is 500 or more, the urethane group concentration is low and therefore, the solvent solubility is high, and when the molecular weight is 1,000 or less, good coating strength can be obtained. The polyol having a cyclic structure and an alkyl chain having 2 or more carbon atoms is preferably a dimer diol having a structure shown by the following formula, which is obtained by hydrogenating and reducing a dimeric acid:

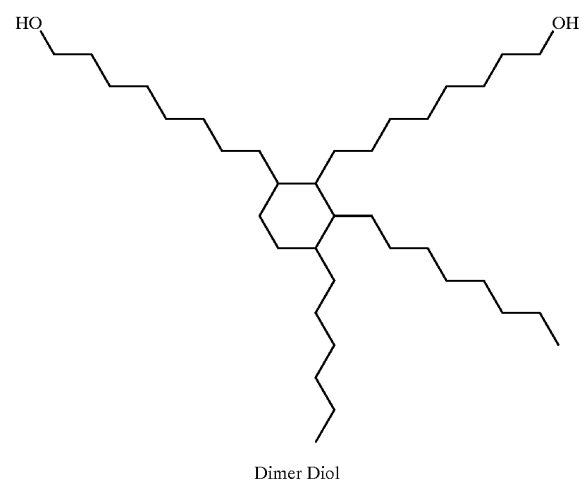

Dimer Diol

The diol having a cyclic structure and an alkyl chain having 2 or more carbon atoms is preferably contained in the polyurethane resin in an amount of 5 to 60% by weight, more preferably from 10 to 40% by weight. When the content of the diol having a cyclic structure and an alkyl chain having 2 or more carbon atoms is within the above-described range, high solvent solubility, good dispersibility and high durability can be advantageously obtained.

The organic diisocyanate used in the present invention for forming a polyurethane resin by reacting it with the above-described polyol is not particularly limited and those commonly used can be used. Specific examples thereof include hexamethylene diisocyanate, tolidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate and 3,3-dimethylphenylene diisocyanate.

The polyurethane resin having a polar group can be produced by producing a polyurethane resin from a starting material monomer having introduced thereinto a polar group. For example, there may be used (1) a method of producing the polyurethane resin from a polar group-containing polyol such as polyester polyol or polyether polyol having a polar group, a polyol such as polyester polyol or polyether polyol having no polar group, and a diisocyanate, and (2) a method of producing the polyurethane resin by replacing a part of a dihydric alcohol or a dibasic acid with a polar group-containing diol or a polar group-containing dibasic acid. The polar group-containing polyol or polar group-containing dibasic acid is, for example, the above-described polyol or dibasic acid which contains on the main or side chain thereof at least one polar group selected from —$SO_3M$, —$OSO_3M$, —$PO(OM)_2$, —$OPO(OM)_2$, —COOM (wherein M represents a hydrogen atom, an alkali metal or an ammonium), —$CONR_1R_2$, —$NR_1R_2$ and —$N^+R_1R_2R_3$ (wherein $R_1$, $R_2$ and $R_3$ each independently represents a hydrogen atom or an alkyl group).

The average molecular weight of the polar group-containing polyurethane resin for use in the present invention is preferably from 5,000 to 100,000, more preferably from 10,000 to 50,000. When the average molecular weight is 5,000 or more, the magnetic coating obtained can have high physical strength and the magnetic recording medium can have good durability. When the molecular weight is 100,000 or less, high solvent solubility and improved dispersibility can be obtained. Furthermore, the coating material can have a suitable viscosity at a predetermined concentration, as a result, good workability and easy handleability can be attained.

The polar group-containing polyurethane resin for use in the present invention preferably has a branched OH group in view of curability and durability. The number of OH groups is preferably from 2 to 40, more preferably from 3 to 20, per one molecule.

In the present invention, a polyurethane resin other than the above-described polyurethane resin may be used in combination.

The polyurethane resin used in combination preferably has the same polar group as the above-described polyurethane resin. Examples of the chain extender which can be used include a substance which itself is known, a polyhydric alcohol, an aliphatic polyamine, an alicyclic polyamine and an aromatic polyamine. Among these, a polyhydric alcohol having a molecular weight of 50 to 500 is preferred. When the molecular weight is 50 or more, high coating strength and good durability can be obtained, and when the molecular weight is 500 or less, the coating can have a high Tg and can be hard and therefore, good durability can be obtained. The polyhydric alcohol is preferably a short chain diol having a cyclic structure, such as bisphenol A, hydrogenated bisphenol A, bisphenol S, bisphenol P, an ethylene oxide or propylene oxide adduct thereof, cyclohexane dimethanol, cyclohexane diol, hydroquinone, bis(2-hydroxyethyl) tetrabromobisphenol A, bis(2-hydroxyethyl) tetrabromobisphenol S, bis(2-hydroxyethyl) tetramethylbisphenol S, bis(2-hydroxyethyl) diphenylbisphenol S, bis(2-hydroxyethyl) diphenylbisphenol, bis(2-hydroxyethyl)thiodiphenol, bis(2-hydroxyethyl)bisphenol F, biphenol, bisphenolfluorene and bisphenolfluorene dihydroxyethyl ether, more preferably an aromatic diol or an alicyclic diol, such as bisphenol A, hydrogenated bisphenol A, bisphenol S, bisphenol P, an ethylene oxide or propylene oxide adduct thereof, cyclohexane dimethanol and cyclohexane diol.

[Vinyl Chloride-Base Resin]

As the binder for use in the present invention, a vinyl chloride-base resin may also be used. The vinyl chloride-base resin used is obtained by copolymerizing various monomers with a vinyl chloride monomer.

Examples of the copolymerization monomer include aliphatic vinyl esters such as vinyl acetate and vinyl propionate, acrylates and methacrylates such as methyl (meth)acrylate, ethyl (meth)acrylate, isopropyl (meth)acrylate, butyl (meth)acrylate and benzyl (meth)acrylate, alkyl allyl ethers such as allyl methyl ether, allyl ethyl ether, allyl propyl ether and allyl butyl ether, and others such as styrene, α-methylstyrene, vinylidene chloride, acrylonitrile, ethylene, butadiene and acrylamides. Furthermore, examples of the copolymerization monomer having a functional group include vinyl alcohol, 2-hydroxyethyl (meth)acrylate, polyethylene glycol (meth)acrylate, 2-hydroxypropyl (meth)acrylate, 2-hydroxypropyl (meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (meth)acrylate, allyl glycidyl ether, phosphoethyl (meth)acrylate, sulfoethyl (meth)acrylate, p-styrenesulfonic acid, and Na salt and K salt thereof.

In the vinyl chloride-base resin, the composition of the vinyl chloride monomer is preferably from 75 to 95% by weight because high dynamic strength, good solvent solubility and high dispersibility of magnetic powder can be obtained.

[Acrylic Resin]

As the binder for use in the present invention, an acrylic copolymer comprising from 1 to 75% by weight of a nitrogen-containing radical polymerizable monomer unit, from 1 to 75% by weight of an aromatic ring-containing radial polymerizable monomer unit and another radical polymerizable monomer unit in an amount of making a total of 100% by weight, and having at least one polar group selected from —$SO_3M$, —$OSO_3M$, —$PO(OM)_2$, —$OPO(OM)_2$, —COOM (wherein M represents a hydrogen atom, an alkali metal or an ammonium salt), —$CONR_1R_2$, —$NR_1R_2$ and —$N^+R_1R_2R_3$ (wherein $R_1$, $R_2$ and $R_3$ each independently represents a hydrogen atom or an alkyl group) may be used.

The "(meth)acrylamide" is a generic term of acrylamide and methacrylamide, and the "(meth)acrylate" is a generic term of acrylate and methacrylate.

Examples of the nitrogen-containing radical polymerizable monomer unit for use in the present invention include (meth)acrylamides such as (meth)acrylamide, diacetone (meth)acrylamide, N-methylol (meth)acrylamide, N-methoxymethyl (meth)acrylamide, N-ethoxymethyl (meth)acrylamide, N-butoxymethyl (meth)acrylamide, N,N-dimethylaminopropyl (meth)acrylamide and N-isopropyl acrylamide, (meth)acrylates such as N,N-dimethylaminomethyl (meth)acrylate, N,N-dimethylaminoethyl (meth)acrylate, N,N-diethylaminomethyl (meth)acrylate, N,N-diethylaminoethyl (meth)acrylate, N,N-dimethylaminopropyl (meth)acrylate, (meth)acryloyl morpholine and morpholinoethyl (meth) acrylate, and vinyl compounds such as N-vinyloxazolidone, N-vinyl-2-pyrrolidone, N-vinylcarbazole, 2-vinyl-4,6-diamino-5-triazine, 2-vinylpyridine, 4-vinylpyridine, maleimide, N-phenylmaleimide and acrylonitrile. Among these nitrogen-containing radical polymerizable monomer units, preferred are N,N-dimethylaminopropyl acrylamide, N-isopropylacrylamide and diacetone acrylamide. The composition of the nitrogen-containing radical polymerizable monomer unit is preferably from 1 to 75% by weight, more preferably from 5 to 60% by weight. Within this range, dispersibility of nonmagnetic powder particles and magnetic powder particles can be improved.

As the aromatic ring-containing radical polymerizable unit for use in the present invention, an aromatic ring-containing (meth)acrylate unit can be used. Examples of the aromatic ring-containing (meth)acrylate unit include benzyl (meth)acrylate, phenoxyethyl (meth)acrylate, phenoxypolyethylene glycol (meth)acrylate and nonylphenol ethylene oxide adduct (meth)acrylate. Among these aromatic ring-containing (meth)acrylate units, preferred are benzyl (meth) acrylate and phenoxyethyl (meth)acrylate. The composition of the aromatic ring-containing (meth)acrylate unit is preferably from 1 to 75% by weight, more preferably from 5 to 60% by weight. When the composition is 1% by weight or more, the dispersibility of nonmagnetic powder particles and magnetic powder particles can be improved and the coating can have sufficiently high smoothness (gloss) and durability, and when the composition is 75% by weight or less, the coating material can have an appropriate viscosity.

Examples of the another copolymerizable monomer unit which can be copolymerized with the nitrogen-containing radical polymerizable monomer unit and the aromatic ring-containing radical polymerizable monomer unit include alkyl (meth)acrylate monomers such as methyl (meth) acrylate, ethyl (meth)acrylate, propyl (meth)acrylate, butyl (meth)acrylate, isobutyl (meth)acrylate, pentyl (meth) acrylate, hexyl (meth)acrylate, octyl (meth)acrylate, 2-ethylhexyl (meth)acrylate, lauryl (meth)acrylate, stearyl (meth)acrylate and cyclohexyl (meth)acrylate, alkoxyalkyl (meth)acrylates such as methoxyethyl (meth)acrylate and butoxyethyl (meth)acrylate, alkyl vinyl ethers such as glycidyl (meth)acrylate, allyl glycidyl ether, methyl vinyl ether, ethyl vinyl ether, isobutyl vinyl ether, n-butyl vinyl ether, 2-ethylhexyl vinyl ether, n-octyl vinyl ether, lauryl vinyl ether, cetyl vinyl ether and stearyl vinyl ether, vinyl acetate, vinyl propionate, maleic acid (anhydride), acrylonitrile and vinylidene chloride. These monomers may be used individually or in combination of two or more thereof.

The number average molecular weight of the acrylic resin is preferably from 1,000 to 200,000, more preferably from 10,000 to 100,000. With a number average molecular weight of 1,000 or more, the magnetic coating can have high physical strength and magnetic tape or the like can have good durability, and with a number average molecular weight of 200,000 or less, the coating material can have a low viscosity, as a result, good workability and easy handleability can be attained.

For introducing a polar group into the vinyl chloride-base resin or acrylic resin having a polar group used in the present invention, the following method can be used.

Into a vinyl chloride-base resin or acrylic resin comprising a vinyl chloride-base monomer unit or comprising a nitrogen-containing radical polymerizable monomer unit and an aromatic-ring containing radical polymerizable monomer unit, but not containing a polar group represented by $-SO_3M$, $-OSO_3M$, $-PO(OM)_2$, $-OPO(OM)_2$, $-COOM$ (wherein M represents a hydrogen atom, an alkali metal or an ammonium salt), $-CONR_1R_2$, $-NR_1R_2$ or $-N^+R_1R_2R_3$ (wherein $R_1$, $R_2$ and $R_3$ each independently represents a hydrogen atom or an alkyl group), at least one of these polar groups is added by a reaction. More specifically, for example, in the case of introducing $-SO_3M$ into a vinyl chloride-base resin or an acrylic resin, a vinyl chloride-base monomer, or a nitrogen-containing radical polymerizable monomer and an aromatic ring-containing radical polymerizable monomer is(are) copolymerized with a copolymerizable compound having a glycidyl group and if desired, another compound copolymerizable therewith, and simultaneously with the copolymerization or after obtaining a copolymer, a compound having $-SO_3M$ is reacted, whereby a polar group can be introduced. Examples of the copolymerizable compound for introducing a glycidyl group include glycidyl (meth)acrylate and glycidyl vinyl ether. These compounds can be used individually or in combination of two or more thereof.

It is also possible to copolymerize a copolymerizable polar group-containing compound together with a vinyl chloride-base monomer or a mixture of a nitrogen-containing radical polymerizable monomer and an aromatic ring-containing radical polymerizable monomer unit, and another copolymerizable compound.

As the copolymerizable polar group-containing compound, a copolymerizable compound containing at least one polar group selected from $-SO_3M$, $-OSO_3M$, $-PO(OM)_2$, $-OPO(OM)_2$, $-COOM$ (wherein M represents a hydrogen atom, an alkali metal or an ammonium salt), $-CONR_1R_2$, $-NR_1R_2$ and $-N^+R_1R_2R_3$ (wherein $R_1$, $R_2$ and $R_3$ each independently represents a hydrogen atom or an alkyl group) can be used. Examples of the copolymerizable compound for introducing $-SO_3M$ include unsaturated hydrocarbon sulfonic acids and salts thereof, such as 2-acrylamide-2-methylpropanesulfonic acid, vinylsulfonic acid, (meth)acrylsulfonic acid and p-styrenesulfonic acid, and sulfoalkyl esters and salts thereof, such as sulfoethyl (meth)acrylate and sulfopropyl (meth)acrylate. The above-described polar groups may be used individually or in combination of two or more thereof. In the case where $-NR_2$ is introduced in addition to $-SO_3M$, a copolymerizable compound containing $-NR_2$ can be used and specific examples thereof include N-dimethylaminopropyl acrylamide and N-isopropyl acrylamide.

For introducing a polar group, a method of copolymerizing a monomer mixture using a polar group-containing radical polymerization initiator at the production of a copolymer, and a method of copolymerizing a monomer mixture in the presence of a chain transfer agent having a polar group at one terminal at the production of a copolymer may also be used.

Examples of the polar group-containing radical polymerization initiator include ammonium persulfate, potassium persulfate and sodium persulfate. The amount of this radical polymerization initiator used is suitably from 1 to 10% by weight, preferably from 1 to 5% by weight, based on the total amount of monomers. The chain transfer agent having a polar group at one terminal is not particularly limited insofar as it can undertake the chain transfer in the polymerization reaction and at the same time, contains a polar group at one terminal, and examples thereof include halogenated compounds and mercapto compounds having a polar group at one terminal, and diphenyl picryl hydrazine. Specific examples of the halogenated compound include 2-chloroethanesulfonic acid, sodium 2-chloroethanesulfonate, 4-chlorophenylsulfoxide, 4-chlorobenzenesulfonamide, p-chlorobenzenesulfonic acid, sodium p-chlorobenzenesulfonate, sodium 2-bromoethanesulfonate and sodium 4-(bromomethyl)-benzenesulfonate. Among these, sodium 2-chloroethanesulfonate and sodium p-chlorobenzenesulfonate are preferred. Examples of the mercapto compound which is preferably used include 2-mercaptoethanesulfonic acid (or a salt thereof), 3-mercapto-1,2-propanediol, mercaptoacetic acid (or a salt thereof), 2-mercapto-5-benzimidazolesulfonic acid (or a salt thereof), 3-mercapto-2-butanol, 2-mercaptobutanol, 3-mercapto-2-propanol, N-(2-mercaptopropyl)glycine, ammonium thioglycolate and β-mercaptoethylamine hydrochloride. These chain transfer agents having a polar group at one terminal can be used individually or in combination of two or more thereof. The chain transfer agent having a polar group at one terminal, which is particularly preferred, is 2-mercaptoethanesulfonic acid (or a salt thereof) having strong polarity. The amount of the chain transfer agent used is preferably from 0.1 to 10% by weight, more preferably from 0.2 to 5% by weight, based on the total amount of monomers.

It is also preferred to introduce a hydroxyl group together with at least one polar group selected from —$SO_3M$, —$OSO_3M$, —$PO(OM)_2$, —$OPO(OM)_2$, —COOM (wherein M represents a hydrogen atom, an alkali metal or an ammonium salt), —$CONR_1R_2$, —$NR_1R_2$ and —$N^+R_1R_2R_3$ (wherein $R_1$, $R_2$ and $R_3$ each independently represents a hydrogen atom or an alkyl group). Examples of the copolymerizable hydroxyl group-containing unit include hydroxyalkyl (meth)acrylates such as hydroxyethyl (meth) acrylate, hydroxypropyl (meth)acrylate, polyethylene glycol mono(meth)acrylate, polypropylene glycol mono(meth) acrylate, polyethylene glycol polypropylene glycol mono (meth)acrylate, glycerol mono(meth)acrylate and 3-chloro-2-hydroxypropyl (meth)acrylate; vinyl ethers such as hydroxyethyl vinyl ether, hydroxypropyl vinyl ether and hydroxybutyl vinyl ether; (meth)allyl ethers such as hydroxyethyl mono(meth)allyl ether, hydroxypropyl mono (meth)allyl ether, hydroxybutyl mono(meth)allyl ether, diethylene glycol mono(meth)allyl ether, dipropylene glycol mono(meth)allyl ether, glycerol mono(meth)allyl ether and 3-chloro-2-hydroxypropyl mono(meth)allyl ether; and (meth)allyl alcohol. A vinyl alcohol unit may be introduced by copolymerizing vinyl acetate and saponifying the copolymer with caustic alkali in a solvent. The amount of the monomer having a hydroxyl group is preferably adjusted to from 5 to 30% by weight in all monomers.

For polymerizing a polymerization reaction system containing the above-described polymerizable compounds and chain transfer agent, a known polymerization method such as suspension polymerization, emulsion polymerization and solution polymerization can be used. Among these polymerization methods, preferred are suspension polymerization and emulsion polymerization having good dry workability, more preferred is emulsion polymerization, because the obtained acrylic copolymer can be easily stored in the solid state ensuring high storage stability. The polymerization conditions vary depending on the kind of the polymerizable compounds, polymerization initiator and chain transfer agent used, however, the preferred conditions for the polymerization in an autoclave are generally such that the temperature is approximately from 50 to 80° C., the gauge pressure is approximately from 4.0 to 1.0 MPa, and the time period is approximately from 5 to 30 hours. The polymerization is preferably performed in an atmosphere of a gas inert to the reaction because the reaction can be easily controlled. Examples of this gas include nitrogen and argon, with nitrogen being preferred in view of profitability. At the polymerization, components other than the above-described components may also be added to the polymerization reaction system. Examples of such components include an emulsifier, an electrolyte and a polymer protective colloid.

In the present invention, the above-described polyurethane resins, vinyl chloride-base resin and acrylic resin may be used in combination and also, other binder having a polar group may be used in combination in an amount equivalent to or lower than the total amount of these resins.

The other resin which can be used in combination is not particularly limited and a known thermoplastic resin, thermosetting resin or reactive resin conventionally used as a binder, or a mixture thereof can be used. Examples of the thermoplastic resin which can be used include those having a glass transition temperature of −100 to 150° C., a number average molecular weight of 1,000 to 200,000, preferably from 10,000 to 100,000. Specific examples thereof include polymers and copolymers containing vinylidene chloride, acrylonitrile, styrene, butadiene, ethylene, vinyl butyral, vinyl acetal, vinyl ether or the like as a constituent unit, and various rubber-base resins. Examples of the thermosetting resin and reactive resin include a mixture of isocyanate prepolymer with phenol resin, phenoxy resin, epoxy resin, urea resin, melamine resin, alkyd resin, acrylic reactive resin, formaldehyde resin, silicone resin, epoxy-polyamide resin or polyester resin.

The above-described binder can be used to have a content of 5 to 50 parts by mass per 100 parts by mass of the ferromagnetic or nonmagnetic powder. When the content is set to from 7 to 45 parts by mass, the surface of magnetic or nonmagnetic layer is enhanced in the glossiness, revealing good dispersion state of ferromagnetic or nonmagnetic powder. Furthermore, when the content is set to from 10 to 40 parts by mass, the electromagnetic conversion characteristics are remarkably improved. If the content is less than 5 parts by mass, the ferromagnetic or nonmagnetic powder is not bound and a deterioration of running durability or the like is occurred, and even if the binder is blended in excess of 50 parts by mass, the dispersion state of the ferromagnetic or nonmagnetic powder is not improved any more and in the magnetic layer, the filling degree of ferromagnetic powder may decrease to incur the deterioration of electromagnetic conversion characteristics.

[Ferromagnetic Powder]

The ferromagnetic powder for use in at least one or more magnetic layer of the present invention is a ferromagnetic hexagonal ferrite powder having an average tabular diameter of 5 to 40 nm. By using the fine particulate magnetic powder, a magnetic recording medium having high surface smoothness and good electromagnetic conversion characteristics can be obtained.

The average tabular diameter of the ferromagnetic hexagonal ferrite powder for use in the present invention is from 5 to 40 nm, preferably from 10 to 35 nm, more preferably from 15 to 30 nm. Particularly, in the case of using a magnetic resistance head (MR head) for the reproduction so as to increase the track density, noises must be reduced. If the average tabular diameter is less than 5 nm, stable magnetization cannot be obtained because of a deterioration of thermal stability, whereas if it exceeds 40 nm, high noises result. Thus, either case is not suitable for high-density magnetic recording. The average plate ratio (tabular diameter/plate thickness) is preferably from 1 to 15, more preferably from 1 to 7. If the plate ratio is less than this range, the filling property in the magnetic layer advantageously increases but satisfactory orientation cannot be obtained, whereas if it exceeds 15, noises increase due to stacking among particles. With the particle size in the above-described range, the specific surface area by the BET method is from 10 to 200 m$^2$/g. This specific surface area substantially coincides with the arithmetic operation value calculated from the particle tabular diameter and the plate thickness. The particle tabular diameter-plate thickness is usually preferred to have a narrower distribution. The distribution cannot be expressed by a numerical value but can be compared by randomly measuring 500 particles on a TEM photograph of particles. The distribution is not normal in many cases but when calculated and expressed by a standard deviation to the average size, σ/average size is from 0.1 to 2.0. For obtaining a sharp particle size distribution, the reaction system for producing particles is rendered uniform as much as possible and the produced particles are subjected to a distribution improving treatment. For example, a method of selectively dissolving superfine particles in an acid solution is known.

The ferromagnetic hexagonal ferrite powder can be manufactured to have a measured coercive force Hc of approximately 39.8 to 398 kA/m (500 to 5,000 Oe). A higher Hc is more advantageous for high-density recording but this is limited by the ability of recording head. In the present invention, the Hc is approximately from 159 to 239 kA/m (2,000 to 3,000 Oe), preferably from 175 to 223 kA/m (2,200 to 2,800 Oe). In the case where the saturation magnetic flux density of the head exceeds 1.4 tesla, the Hc is preferably 159 kA/m (2,000 Oe) or more. The Hc can be controlled, for example, by the particle size (tabular diameter·plate thickness), the kind and amount of elements contained, the substitution site of elements and the reaction conditions in the production of particles. The saturation magnetization σs is from 40 to 80 A·m$^2$/kg (40 to 80 emu/g). The σs is preferably higher but as the particle is finer, the σs is liable to be lower. It is well known to improve the σs by compounding spinel ferrite with magnetoplumbite ferrite or selecting the kind and amount added of the elements contained. Also, W-type hexagonal ferrite can be used.

Examples of the method for producing hexagonal ferrite include the followings, however, in the present invention, the production method is not limited.

(1) A glass crystallization method where a metal oxide for substituting barium oxide.iron oxide.iron and a boron oxide or the like as the glass-forming substance are mixed to have a desired ferrite composition, the mixture is melted and quenched to form an amorphous body, and the amorphous body is again heat-treated and then washed/ground to obtain a barium ferrite crystal powder.

(2) A hydrothermal reaction method where a metal salt solution of a barium ferrite composition is neutralized with an alkali and after removing by-products, the liquid phase is heated at 100° C. or more, then washed, dried and ground to obtain a barium ferrite crystal powder.

(3) A co-precipitation method where a metal salt solution of a barium ferrite composition is neutralized with an alkali and after removing by-products, dried, treated at 1,100° C. or less and ground to obtain a barium ferrite crystal powder.

At the time of dispersing magnetic powder, the surface of the magnetic particle is sometimes treated with a substance selected according to the dispersion medium and polymer. An organic compound or an organic compound is used as the surface treating material. Representative examples of predominantly employed compounds include compounds such as Si, Al and P, various silane coupling agents and various titanium coupling agents. The amount of the surface treating material is suitably from 0.1 to 10% based on the magnetic powder. The pH of the magnetic powder also plays an important role in the dispersion. The pH is usually on the order of 4 to 12 and although the optimal value varies depending on the dispersion medium and polymer, a pH of approximately from 6 to 11 is selected in view of chemical stability and storability of the medium. The water content contained in the magnetic powder also affects the dispersion. Although the optimal value varies depending on the dispersion medium and polymer, a value of 0.01 to 2.0% is usually selected.

[Abrasive]

In the magnetic recording medium of the present invention, the magnetic layer contains diamond as an abrasive. By using a small amount of diamond, durability can be ensured and adverse effects such as aggregation of magnetic powder and other defects in the magnetic layer can be extremely reduced. As a result, noises can be remarkably improved, the output can be slightly increased and a magnetic recording medium having both high-density recording property and running durability can be obtained.

The diamond used as an abrasive has an average particle size of 0.03 to 0.5 μm, preferably from 0.05 to 0.3 μm. If the average particle size is less than 0.03 μm, the effect of improving the durability is small for the amount added, whereas if it exceeds 0.5 μm, noises increase despite excellent durability. In the present invention, the maximum diameter of each diamond particle is defined as the particle size and the average particle size means an average of measured values of 500 particles randomly selected on an image by a transmission electron microscope (TEM).

The amount of diamond added is from 0.1 to 5% by weight, preferably from 0.03 to 3.00% by weight, based on the ferromagnetic hexagonal ferrite powder. If the amount added is less than 0.01% by weight, durability is difficultly ensured, whereas if it exceeds 5% by weight, the effect of reducing noises by the addition of diamond decreases. In view of noise and durability, the amount added and average particle size of diamond are preferably in the above-described range, however, in view of noise, the amount of diamond added is preferably as small as possible and in the magnetic recording medium of the present invention, the amount added and the average particle size of diamond are preferably selected appropriately from the above-described range according to the magnetic recording/reproducing apparatus.

The particle size distribution of diamond is preferably such that the number of particles having a particle size of 200% or more of the average particle size is 5% or less in the number of all diamond particles and the number of particles having a particle size of 50% or less of the average particle size is 20% or less. The maximum particle size of diamond used in the present invention is usually 3.00 μm, preferably about 2.00 μm, and the minimum size is 0.01 μm, preferably about 0.02 μm.

In the measurement of the particle size distribution, the number of particles having the above-described particle size is counted based on the average particle size. The particle size distribution of diamond also affects the durability and noise. If the particle size distribution is broader than the above-described range, the effect obtainable by the average particle size cannot be obtained. More specifically, if particles having an excessively large particle size occupy a larger proportion, the noise may be increased or the head may be flawed, whereas if particles having a too small particle size occupy a larger proportion, the abrasion effect is insufficient. Furthermore, diamond having an extremely narrow particle size distribution is expensive, therefore, diamond in the range of the above-described particle size distribution is advantageous in view of cost. The diamond particle has high hardness and when diamond particles having a sharp particle size distribution and a fine particle size are used, an abrasive effect equal to conventional abrasives can be obtained by a small content. This is advantageous in view of noise.

In the present invention, a conventionally used abrasive such as alumina and SiC may be used in combination with the diamond, however, the content of such an abrasive is preferably 500% by weight or less based on the diamond. The effect on the durability and SN ratio is higher when only a small amount of diamond is used, however, in view of cost and the like, an abrasive other than diamond, such as alumina and SiC, can be added. Even in this case, since diamond is contained, the amount added of alumina necessary for durability can be fairly reduced as compared with the sole use of alumina. This is preferred also from the standpoint of ensuring the durability and reducing noises.

The diamond for use in the present invention is usually an artificial diamond, because the natural diamond is expensive. Examples of the method for producing a diamond include a method of producing a diamond through graphite and iron, Co, Ni or the like at high temperature and high pressure, a method called a static synthesis method of reacting graphite or furan resin carbon at high temperature and high pressure, a dynamic synthesis method, and a vapor phase synthesis method. In the present invention, the production method of diamond is not limited.

Industrially, secondary use is also possible, where a diamond used for cutting or abrasion is used after discriminating and washing impurities. In the present invention, the diamond particles preferably have a distribution in the above-described range. For this purpose, diamond particles may be classified, for example, by using a centrifugal force from a dispersion solution or by using a special mesh filter.

The diamond can be used in combination with another abrasive as described above. As the another abrasive, the above-described alumina abrasive (for example, α-alumina having an α conversion of 90% or more, and β-alumina) and known materials having a Mohs' hardness of 6 or more, such as silicon carbide, chromium oxide, cerium oxide, α-iron oxide, corundum, silicon nitride, titanium carbide, titanium oxide, silicon dioxide and boron nitride, are mainly used individually or in combination. Also, a composite of these abrasives with each other (an abrasive surface-treated with another abrasive) may be used. This abrasive sometimes contains compounds and elements other than the main component, however, if the main component occupies 90% or more, there is no change in the effect. The particle size of the abrasive is preferably from 0.01 to 2 $\mu$m. Particularly, for elevating the electromagnetic conversion characteristics, the particle size distribution thereof is preferably narrow. In order to improve the durability, if desired, abrasives different in the particle size may be used in combination or even in the case of a sole abrasive, the same effect can be attained by broadening the particle size distribution. This abrasive preferably has a tap density of 0.3 to 2 g/ml, a water content of 0.1 to 5%, a pH of 2 to 11 and a specific surface area of 1 to 30 m$^2$/g. The abrasive for use in the present invention may have any of acicular, spherical and die-like shapes, however, a shape partially having edges is preferred because of high abrasive property. Specific examples of the abrasive include AKP-12, AKP-15, AKP-20, AKP-30, AKP-50, HIT-20, HIT-30, HIT-55, HIT-60, HIT-70, HIT-80 and HIT-100 (all produced by Sumitomo Chemical Co., Ltd.), ERC-DBM, HP-DBM, and HPS-DBM (all produced by Reynolds International Inc.), WA10000 (produced by Fujimi Kenmazai), UB20 (produced by Uemura Kogyo), G-5, Kromex U2 and Kromex U1 (produced by Nippon Chemical Industrial Co., Ltd.), TF100 and TF140 (produced by Toda Kogyo Co., Ltd.), β-Random Ultrafine (produced by Ibiden Co., Ltd.), and B-3 (produced by Showa Mining Co., Ltd.). These abrasives may be added also to a nonmagnetic layer, if desired. By adding to a nonmagnetic layer, the surface shape or the protruded state of abrasive can be controlled. Of course, the particle size and the amount of abrasive added to the magnetic layer or the nonmagnetic layer must be set to optimal values.

[Nonmagnetic Layer]

In the magnetic recording medium of the present invention, a nonmagnetic layer comprising a binder and a nonmagnetic powder may be provided on the nonmagnetic support as an underlying layer of the magnetic layer.

The nonmagnetic powder which can be used in the nonmagnetic layer may be either an inorganic substance or an organic substance. Also, carbon black and the like may be used. Examples of the inorganic substance include metals, metal oxides, metal carbonates, metal sulfates, metal nitrides, metal carbides and metal sulfides. Specific examples thereof include titanium oxide (e.g., titanium dioxide), cerium oxide, tin oxide, tungsten oxide, ZnO, $ZrO_2$, $SiO_2$, $Cr_2O_3$, α-alumina having an α conversion of 90% to 100%, β-alumina, γ-alumina, α-iron oxide, goethite, corundum, silicon nitride, titanium carbide, magnetism oxide, boron nitride, molybdenum disulfide, copper oxide, $MgCO_3$, $CaCO_3$, $BaCO_3$, $SrCO_3$, $BaSO_4$, silicon carbide and titanium carbide. These substances may be used individually or in combination of two or more thereof. Among these, α-iron oxide and titanium oxide are preferred. The nonmagnetic powder may have any of acicular, spherical, polyhedral and plate shapes. The crystallite size of the nonmagnetic powder is preferably from 4 nm to 1 $\mu$m, more preferably from 40 nm to 100 nm. When the crystallite size is 4 nm or more, good dispersibility can be obtained, and when it is 1 $\mu$m or less, good surface smoothness can be obtained. The average particle size of the nonmagnetic powder is preferably from 5 nm to 2 $\mu$m, more preferably from 100 to 200 nm. If desired, nonmagnetic powders different in the average particle size may be used in combination or even in the case of a single nonmagnetic powder, the same effect can be provided by broadening the particle size distribution. When the average particle size is 5 nm or more, good dispersibility can be obtained and when it is 2 $\mu$m or less, good surface smoothness can be obtained.

The specific surface area of the nonmagnetic powder is preferably from 1 to 100 m$^2$/g, more preferably from 5 to 70 m$^2$/g, still more preferably from 10 to 65 m$^2$/g. When the specific surface area is 1 m$^2$/g or more, high surface smoothness can be obtained and when it is 100 m$^2$/g or less, good dispersibility can be obtained, for example, dispersion can be attained with a desired amount of binder.

The oil absorption amount using dibutyl phthalate (DBP) is suitably from 5 to 100 ml/100 g, preferably from 10 to 80 ml/100 g, more preferably from 20 to 60 ml/100 g. The specific gravity is suitably from 1 to 12, preferably from 3 to 6. The tap density is suitably from 0.05 to 2 g/ml, preferably from 0.2 to 1.5 g/ml. When the tap density is 0.05 g/ml or more, flying of particles is reduced and when it is 2 g/ml or less, the powder does not adhere to the apparatus. As a result, in either case, good operability can be ensured.

The pH of the nonmagnetic powder is preferably from 2 to 11, more preferably from 6 to 9. When the pH is 2 or more, the coefficient of friction is liable to decrease at high temperature and high humidity and when the pH is 11 or less, the amount of fatty acid liberated increases and the coefficient of friction is liable to decrease.

The water content of the nonmagnetic powder is suitably from 0.1 to 5% by weight, preferably from 0.2 to 3% by weight, more preferably from 0.3 to 1.5% by weight. When the water content is 0.1% by weight or more, good dispersibility can be obtained and when it is 5% by weight or less, the coating material after dispersion is liable to be stabilized in the viscosity. The ignition loss is preferably 20% by weight or less and a lower ignition loss is preferred. In the case where the nonmagnetic powder is an inorganic powder, the Mohs' hardness is preferably from 4 to 10. If the Mohs' hardness is less than 4, durability may not be ensured. The stearic acid absorption amount of the nonmagnetic powder is suitably from 1 to 20 $\mu$mol/m$^2$, preferably from 2 to 15 $\mu$mol/m$^2$. The heat of wetting to water at 25° C. of the nonmagnetic powder is preferably from 20 to 60 $\mu$J/cm$^2$ (200 to 600 erg/cm$^2$). Also, a solvent having a heat of wetting in this range may be used. The number of water molecules on the surface is suitably from 1 to 10 molecules per 10 nm at 100 to 400° C. The pH at the isoelectric point in water is preferably from 3 to 9.

The nonmagnetic powder is preferably surface-treated with $Al_2O_3$, $SiO_2$, $TiO_2$, $ZrO_2$, $SnO_2$, $Sb_2O_3$ or ZnO. Among these, $Al_2O_3$, $SiO_2$, $TiO_2$ and $ZrO_2$ are preferred in view of the dispersibility, and $Al_2O_3$, $SiO_2$ and $ZrO_2$ are more preferred. These may be used in combination or individually. According to the purpose, a surface-treating layer formed by co-precipitation may be used or a method of treating the surface with alumina and then treating the surface layer with silica or a method reversed thereto may also be employed. The surface-treating layer may be porous depending on the purpose, however, in general, the layer is preferably homogeneous and dense.

Specific examples of the nonmagnetic powder for use in the underlying layer of the present invention include Nanotite (produced by Showa Denko K.K.), HIT-100, ZA-G1 (both produced by Sumitomo Chemical Co., Ltd.), DPN-250, DPN-250BX, DPN-245, DPN-270BX, DPB-550BX, DPN-550RX (all produced by Toda Kogyo Corp.), TTO-51B, TTO-55A, TTO-55B, TTO-55C, TTO-55S, TTO-55D, SN-100, MJ-7, α-iron oxide E270, E271, E300 (all produced by Ishihara Sangyo Kaisha Ltd.), STT-4D, STT-30D, STT-30, STT-65C (all produced by Titan Kogyo K.K.), MT-100S, MT-100T, MT-150W, MT-500B, MT-600B, MT-100F, MT-500OHD (all produced by Teika Co., Ltd.), FINEX-25, BF-1, BF-10, BF-20, ST-M (all produced by Sakai Chemical Industry Co., Ltd.), DEFIC-Y, DEFIC-R (both produced by Dowa Mining Co., Ltd.), AS2BM, TiO2P25 (both produced by Nippon Aerosil K.K.), 100A, 500A (both produced by Ube Industries, Ltd.), Y-LOP (produced by Titan Kogyo K.K.), and calcined products thereof. The nonmagnetic powder is particularly preferably titanium dioxide or α-iron oxide.

In the nonmagnetic layer, carbon black may be mixed together with the nonmagnetic powder so as to reduce the surface electric resistance (Rs) and the light transmittance and at the same time, obtain a desired micro Vickers hardness. The micro Vickers hardness of the underlying layer is usually from 25 to 60 Kg/mm$^2$ and for controlling the head abutting, preferably from 30 to 50 Kg/mm$^2$. The micro Vickers hardness can be determined by means of a thin film hardness meter (HMA-400, manufactured by NEC Corp.) using a diamond triangular pyramid needle having a sharpness of 80° and a tip radius of 0.1 $\mu$m as an indenter foot. According to the industrial standard for the light transmittance in general, the absorption of infrared ray having a wavelength of about 900 nm is 3% or less and in the case of VHS for example, 0.8% or less. In order to accord with this standard, furnace black for rubber, thermal black for rubber, black for color, acetylene black or the like may be used.

The carbon black for use in the nonmagnetic layer of the present invention suitably has a specific surface area of 100 to 500 m$^2$/g, preferably from 150 to 400 m$^2$/g, and a DBP oil absorption of 20 to 400 ml/100 g, preferably from 30 to 200 ml/100 g. The particle size of the carbon black is suitably from 5 to 80 nm, preferably from 10 to 50 nm, more preferably from 10 to 40 nm. Furthermore, the carbon black preferably has a pH of 2 to 10, a water content of 0.1 to 10% and a tap density of 0.1 to 1 g/ml. Specific examples of the carbon black for use in the present invention include BLACKPEARLES 2000, 1300, 1000, 900, 800, 880 and 700, VULCAN XC-72 (all produced by Cabot Co., Ltd.), #3050B, #3150B, #3250B, #3750B, #3950B, #950, #650B, #970B, #850B, MA-600 (all produced by Mitsubishi Chemical Industries, Ltd.), CONDUCTEX SC, RAVEN 8800, 8000, 7000, 5750, 5250, 3500, 2100, 2000, 1800, 1500, 1255, 1250 (all produced by Columbia Carbon Co., Ltd.) and Ketjen Black EC (produced by Akzo Co., Ltd.). The carbon black may be used after it is surface-treated with a dispersant or grafted with a resin or after a part of the surface is graphitized. The carbon black may be previously dispersed in a binder before the addition to the coating material. The carbon black can be used within the range of not exceeding 50% by weight based on the above-described inorganic powder and not exceeding 40% of the total mass of the nonmagnetic layer. These carbon blacks can be used individually or in combination. The carbon blacks which can be used in the present invention are described, for example, in *Carbon Black Binran* (*Handbook of Carbon Blacks*), compiled by Carbon Black Kyokai.

If desired, an organic powder may also be added to the nonmagnetic layer according to the purpose. Examples thereof include acryl styrene-base resin powder, benzoguanamine resin powder, melamine-base resin powder and phthalocyanine-base pigment. In addition, polyolefin-base resin powder, polyester-base resin powder, polyamide-base resin powder, polyimide-base resin powder and polyethylene fluoride resin may also be used.

[Other Additives]

In the magnetic recording medium of the present invention, the magnetic layer or the underlying nonmagnetic layer may contain additives for imparting a dispersion effect, a lubricating effect, an antistatic effect, a plastic effect or the like. Examples of the additives which can be used include molybdenum disulfide; tungsten disulfide; graphite; boron nitride; fluorinated graphite; silicone oil; silicone having a polar group; fatty acid-modified silicone; fluorine-containing silicone; fluorine-containing alcohol; fluorine-containing ester; polyolefin; polyglycol; polyphenyl ether; aromatic ring-containing organic phosphonic acids and alkali metal salts thereof, such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid and nonylphenylphosphonic acid; alkylphosphonic acids and alkali metal salts thereof, such as octylphosphonic acid, 2-ethylhexylphosphonic acid, isooctylphosphonic acid, (iso)nonylphos phonic acid, (iso) decylphosphonic acid, (iso)undecylphosphonic acid, (iso) dodecylphosphonic acid, (iso)hexadecylphosphonic acid, (iso)octadecylphosphonic acid and (iso)eicosylphosphonic acid; aromatic phosphoric acid esters and alkali metal salts thereof, such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate and nonylphenyl phosphate; phosphoric acid alkyl esters and alkali metal salts thereof, such as octyl phosphate, 2-ethylhexyl phosphate, isooctyl phosphate, (iso)nonyl phosphate, (iso)decyl phosphate, (iso)undecyl phosphate, (iso)dodecyl phosphate, (iso)hexadecyl phosphate, (iso) octadecyl phosphate and (iso)eicosyl phosphate; monobasic fatty acids having from 10 to 24 carbon atoms, which may contain an unsaturated bond or may be branched, and metal salts thereof, such as lauric acid, myristic acid, palmitic acid, stearic acid, behenic acid, butyl stearate, oleic acid, linoleic acid, linolenic acid, elaidic acid and erucic acid; monofatty acid esters, difatty acid esters and polyfatty acid esters consisting of a monobasic fatty acid having from 10 to 24 carbon atoms, which may contain an unsaturated bond or may be branched, and any one of a mono- to hexa-hydric alcohol having from 2 to 22 carbon atoms, which may contain an unsaturated bond or may be branched, an alkoxy alcohol having from 12 to 22 carbon atoms, which may contain an unsaturated bond or may be branched, and a monoalkyl ether of an alkylene oxide polymer, such as butyl stearate, octyl stearate, amyl stearate, isooctyl stearate, octyl myristate, butyl laurate, butoxyethyl stearate, anhydrosorbitan monostearate, anhydrosorbitan distearate and anhydrosorbitan tristearate; fatty acid amides having from 2 to 22 carbon atoms; and aliphatic amines having from 8 to 22 carbon atoms. Other than the above-described hydrocarbon groups, those having a nitro group and an alkyl, aryl or aralkyl group substituted by a group except for a hydrocarbon group, such as halogen-containing hydrocarbon (e.g., F, Cl, Br, $CF_3$, $CCl_3$, $CBr_3$) may also be used. Furthermore, nonionic surfactants such as alkylene oxide type, glycerin type, glycidol type and alkylphenol ethylene oxide adduct; cationic surfactants such as cyclic amine, ester amide, quaternary ammonium salts, hydantoin derivative, heterocyclic compounds, phosphoniums and sulfoniums; anionic surfactants containing an acidic group such as carboxylic acid, sulfonic acid or sulfuric acid ester group; and amphoteric surfactants such as amino acids, aminosulfonic acids, sulfuric acid or phosphoric acid esters of amino-alcohol, and alkylbetaine type, may be used. These surfactants are described in detail in *Kaimen Kasseizai Binran* (*Handbook of Surfactants*), Sangyo Tosho K.K. These lubricant, antistatic agent and the like need not be necessarily pure and may contain impurities other than the main component, such as isomer, unreacted material, by-product, decomposition product and oxide. The content of these impurities is preferably 30% by weight or less, more preferably 10% by weight or less.

Specific examples thereof include NAA-102, castor hardened fatty acid, NAA-42, Cation SA, Nymeen L-201, Non-ion E-208, Anon BF, Anon LG (all produced by NOF Corporation), FAL-205, FAL-123 (both produced by Takemoto Yushi K.K.), NJLub LO (produced by New Japan Chemical Co., Ltd.), TA-3 (produced by Shin-Etsu Chemical Industry Co., Ltd.), Armide P (produced by Lion Armour Co., Ltd.), Duomine TDO (produced by Lion Corp.), BA-41G (produced by Nisshin Oil Mills, Ltd.), and Profan 2012E, Newpole PE61, Ionet MS-400 (all produced by Sanyo Chemical Industries Ltd.).

These dispersant, lubricant and surfactant for use in the present invention each may be properly differentiated in the kind and content between the nonmagnetic layer and the magnetic layer according to the purpose, if desired. For example, the dispersant has properties of adsorbing or bonding through a polar group and it is presumed that the dispersant mainly adsorbs or bonds to the ferromagnetic powder surface in the magnetic layer and mainly adsorbs or bonds through the above-described polar group onto the nonmagnetic powder surface in the nonmagnetic layer and the organic phosphorus compound once adsorbed does not desorb with ease from the surface of metal or metal compound. Accordingly, the surface of the ferromagnetic powder or nonmagnetic powder of the present invention is in the state covered with an alkyl group, an aromatic group or the like, whereby the affinity of the ferromagnetic or nonmagnetic powder for the binder resin components is elevated and the dispersion stability of the ferromagnetic or nonmagnetic powder is also improved. The lubricant is present in the liberated state and therefore, it may be considered to prevent the lubricant from dissolving out to the surface by using fatty acids different in the melting point between the nonmagnetic layer and the magnetic layer or by using esters different in the boiling point or polarity, to improve the coating stability by controlling the surfactant content, or to improve the lubricating effect by adding the lubricant in a larger amount to the nonmagnetic layer. The present invention is of course not limited to these examples. The additives for use in the present invention may be added entirely or partially at any step during the preparation of the coating solution for the magnetic layer or the underlying layer. For example, the additives may be mixed with ferromagnetic powder before the kneading step, may be added at the step of kneading ferromagnetic powder, binder and solvent, may be added at the dispersion step, may be added after the dispersion or may be added immediately before the coating.

The coating solution prepared using the above-described materials is coated on a nonmagnetic support to form a nonmagnetic or magnetic layer.

[Nonmagnetic Support]

Examples of the nonmagnetic support which can be used in the present invention include known materials such as biaxially stretched polyethylene naphthalate, polyethylene terephthalate, polyamide, polyimide, polyamide-imide, aromatic polyamide and polybenzoxidazole. Among these, preferred are polyethylene naphthalate and aromatic polyamide. The nonmagnetic support may be previously subjected to corona discharge treatment, plasma treatment, treatment for facilitating the adhesion, heat treatment or the like. The surface of the nonmagnetic support which can be used in the present invention preferably has excellent smoothness such that the center line average surface roughness is from 0.1 to 20 nm, preferably from 1 to 10 nm, at a cut-off value of 0.25 mm. Furthermore, the nonmagnetic support preferably has not only a small center line average surface roughness but also no coarse protrusion of 1 $\mu$m or more.

The support preferably has an arithmetic average roughness of, in terms of (Ra) value according to JIS B0660-1998, ISO 4287-1997, 0.1 µm or less because the obtained magnetic recording medium is reduced in noises. In the magnetic recording medium of the present invention, the thickness of the nonmagnetic support is preferably from 3 to 80 µm.

[Backcoat Layer and Undercoat Layer]

A backcoat layer (backing layer) may be provided on the surface of the nonmagnetic support for use in the present invention, where the magnetic coating material is not coated. The backcoat layer is a layer provided by coating a backcoat layer-forming coating material comprising an organic solvent having dispersed therein a binder and particulate components such as abrasive and antistatic agent on the nonmagnetic support surface where the magnetic coating material is not coated. Various inorganic pigments and carbon black can be used as the particulate component. As the binder, resins such as nitrocellulose, phenoxy resin, vinyl chloride-base resin and polyurethane can be used individually or in combination. In the present invention, an adhesive layer may be provided on the nonmagnetic support surfaces coated with the magnetic coating material and with the backcoat layer-forming coating material.

In the magnetic recording medium of the present invention, an undercoat layer may also be provided. By providing an undercoat layer, the adhesive strength between the support and the magnetic or underlying nonmagnetic layer can be enhanced. For the undercoat layer, a solvent-soluble polyester resin is used. An undercoat layer having a thickness of, for example, 0.5 µm or less can be used.

[Production Method]

The magnetic recording medium of the present invention is produced, for example, by coating a magnetic coating solution on the surface of a nonmagnetic support under running to a predetermined thickness. A plurality of magnetic layer coating solutions may be sequentially or simultaneously coated one on another or the nonmagnetic layer coating solution and the magnetic layer coating solution may be sequentially or simultaneously coated one on another. For coating the magnetic or nonmagnetic layer coating solution, coating machines such as air doctor coat, blade coat, rod coat, extrusion coat, air knife coat, squeeze coat, impregnation coat, reverse roll coat, transfer roll coat, gravure coat, kiss coat, cast coat, spray coat and spin coat can be used. These are described, for example, in *Saishin Coating Gijutsu* (*Latest Coating Technology*), issued by Sogo Gijutsu Center (May 31, 1983). In the case of applying these coating machines to the magnetic recording medium of the present invention, examples of the apparatus and method for coating include the followings.

(1) The underlying layer is first coated by a coating apparatus commonly used for the coating of magnetic layer coating solution, such as gravure, roll, blade or extrusion, and while the underlying layer is still in the non-dried state, the upper layer is coated by a support pressure-type extrusion coating apparatus disclosed in JP-B-1-46186, JP-A-60-238179 and JP-A-2-265672.

(2) The upper and underlying layers are almost simultaneously coated by one coating head having two slits for passing a coating solution disclosed in JP-A-63-88080, JP-A-2-17971 and JP-A-2-265672.

(3) The upper and underlying layers are almost simultaneously coated by an extrusion coating apparatus with a back-up roll disclosed in JP-A-2-174965.

In the magnetic recording medium of the present invention, the thickness of the magnetic layer is optimized by the saturation magnetization amount of the head used, the head gap length and the recording signal band, but the thickness is generally from 0.01 to 0.10 µm, preferably from 0.02 to 0.08 µm, more preferably from 0.03 to 0.08 µm. The magnetic layer can be separated into two or more layers different in the magnetic characteristics and known constructions for the multilayer-type magnetic layer can be applied. In the case of a magnetic tape, the coated layer of the magnetic layer coating solution is subjected to a treatment of applying longitudinal magnetic orientation to the ferromagnetic powder contained in the coated layer using a cobalt magnet or a solenoid. In the case of a disk, a sufficiently isotropic orienting property may be obtained without performing orientation using an orientation apparatus, however, a known random orientation apparatus is preferably used, where cobalt magnets are diagonally and alternately disposed or an ac magnetic field is applied by a solenoid. As for the isotropic orientation, in the case of a ferromagnetic metal fine powder, in-plane two dimensional random orientation is generally preferred but three dimensional random orientation may also be provided by incorporating a vertical component. In the case of hexagonal ferrite, three dimensional random orientation of in-plane and in the vertical direction is readily provided in general, however, in-plane two dimensional random orientation can also be provided. Furthermore, vertical orientation may be provided using a well-known method such as different pole and counter position magnet to have isotropic magnetic characteristics in the circumferential direction. In particular, when high-density recording is performed, vertical orientation is preferred. Also, circumferential orientation may be provided using spin coating. The drying position of the coating is preferably controlled by controlling the temperature and amount of drying air and the coating rate. The coating rate is preferably from 20 to 1,000 m/min and the temperature of drying air is preferably 60° C. or more. Furthermore, preliminary drying may also be appropriately performed before entering the magnet zone.

After the drying, the coated layer may be subjected to a surface smoothing treatment. In the surface smoothing treatment, for example, a supercalender roll can be used. By performing the surface smoothing treatment, the holes generated as a result of removal of the solvent at the drying disappear and the filling ratio of ferromagnetic powder in the magnetic layer is elevated, so that the obtained magnetic recording medium can have high electromagnetic conversion characteristics. For the calendering roll, a heat-resistant plastic roll such as epoxy, polyimide, polyamide and polyamide-imide can be used. Also, this treatment can be performed using a metal roll. The surface of the magnetic recording medium of the present invention preferably has very excellent smoothness such that the center line average roughness is from 0.1 to 4 nm, preferably from 1 to 3 nm, at a cut-off value of 0.25 mm. This is attained by a method where the magnetic layer formed by selecting a specific ferromagnetic powder and a specific binder as described above is subjected to the calendering treatment. As for the calendering treatment conditions, the calender roll is suitably operated at a temperature of 60 to 100° C., preferably from 70 to 100° C., more preferably from 80 to 100° C., and a pressure of 100 to 500 Kg/cm, preferably from 200 to 450 Kg/cm, more preferably from 300 to 400 Kg/cm. The obtained magnetic recording medium is cut into a desired size using a cutter or the like and then used.

In the magnetic recording medium of the present invention, the magnetic powder for use in the magnetic layer has a very small particle size and the binder contains a very large number of hydrophilic polar groups, so that water adsorbed on the magnetic powder surface and a slight amount of water in the solvent of the coating solution can be easily maintained. As a result, it is considered that the binder readily undergoes plastic flow and the formability in the calendering step is improved.

EXAMPLES

The present invention is described in greater detail below by referring to Examples, however, the present invention should not be construed as being limited thereto. Unless otherwise indicated, the "parts" in the Examples is "parts by mass".

[Synthesis of Binder]

Synthesis Example PUA-1 (Synthesis of Polyurethane Resin PUA-1)

In a container equipped with a thermometer, a stirrer and a reflux condenser and previously purged with nitrogen, a polyether polyol having a composition shown in Table 1 and a short chain diol having a cyclic structure were dissolved in a 30% solution of cyclohexanone at 60° C. in a nitrogen stream. Thereafter, 60 ppm of dibutyltin dilaurate was added as a catalyst and further dissolved for 15 minutes. Furthermore, an organic diisocyanate compound shown in Table 1 was added and reacted under heating for 6 hours to obtain Polyurethane Resin PUA-1. The hydrophilic polar group (—$SO_3Na$) content of Polyurethane Resin PUA-1 obtained was 0.287 meq/g.

Synthesis Examples PUA-2, PUa-3, PUC-1 and PUc-2 (Synthesis of Polyurethane Resins PUA-2, PUa-3, PUC-1 and PUc-2)

Polyurethane Resins PUA-2, PUa-3, PUC-1 and PUc-2 were obtained in the same manner as in Synthesis Example PUA-1 by using a chain extender and an organic diisocyanate compound shown in Table 1. The hydrophilic polar group (—$SO_3Na$) content in each of Polyurethane Resins PUA-2, PUa-3, PUC-1 and PUc-2 obtained is shown in Table 1.

Synthesis Example PUB-1 (Synthesis of Polyurethane Resin PUB-1)

(1) Synthesis of Polyester Polyol A

Into a reactor equipped with a thermometer, a stirrer and a reflux condenser, 365 parts of adipic acid and 260 parts of neopentyl glycol were charged and 2% by weight of zinc acetate and 3% by weight of sodium acetate were charged as catalysts. A transesterification reaction was performed at 180 to 220° C. for 3 hours and a polycondensation reaction was performed at 220 to 280° C. under reduced pressure of 1 to 10 mmHg for 2 hours. In this way, Polyester Polyol A was obtained.

(2) Synthesis of Polyurethane Resin PUB-1

Using Polyester Polyol A obtained above, Polyurethane Resin PUB-1 was obtained in the same manner as in Example PUA-1 by using a chain extender and an organic diisocyanate compound shown in Table 1. The hydrophilic polar group (—$SO_3Na$) content of Polyurethane Resin PUB-1 obtained was 0.339 meq/g.

Synthesis Examples PUB-2, PUB-3 and PUb-4 (Synthesis of Polyurethane Resins PUB-2, PUB-3 and PUb-4)

Polyurethane Resins PUB-2, PUB-3 and PUb-4 were obtained in the same manner as in Synthesis Example PUB-1 by using Polyester Polyol A, a chain extender and an organic diisocyanate compound shown in Table 1. The hydrophilic polar group (—$SO_3Na$) content in each of Polyurethane Resins PUB-2, PUB-3 and PUb-4 obtained is shown in Table 1.

Synthesis Example PVC-1 (Synthesis of Vinyl Chloride-Base Resin PVC-1)

Into a polymerization reactor, 130 parts of deionized water, 117 parts of methanol, 0.6 parts of methyl cellulose 0.2 parts of polyoxyethylene sorbitan fatty acid partial esterified product and 0.52 parts of trichloroethylene were charged. After the inside of system was degassed under pressure, vinyl chloride monomer, glycidyl allyl ether and 2-hydroxypropyl methacrylate shown in Table 2 were charged and stirred with 60#C. Thereafter, 0.42 parts of 3,3,5-trimethylhexanoyl peroxide was charged and simultaneously with the initiation of polymerization, 8 parts of sodium p-styrenesulfonate dissolved in 40 parts of methanol was continuously charged at a constant rate to consume the entire amount within 8 hours. After the reaction for 13 hours, when the pressure of the polymerization reactor reached 3 kg/cm$^2$, the system was cooled to obtain Vinyl Chloride-Base Resin PVC-1. The hydrophilic polar group (—$SO_3Na$) content of Vinyl Chloride-Base Resin PVC-1 obtained was 0.336 meq/g.

Synthesis Examples PVC-2 and PVc-3 (Synthesis of Vinyl Chloride-Base Resins PVC-2 and PVc-3)

Vinyl Chloride-Base Resins PVC-2 and PVc-3 were obtained in the same manner as in Synthesis Example PVC-1 by using vinyl chloride monomer and other radical polymerizable monomer units shown in Table 2. The hydrophilic polar group (—$SO_3Na$) content in each of Vinyl Chloride-Base Resins PVC-2 and PVc-3 obtained is shown in Table 2.

Synthesis Example AC-1 (Synthesis of Acrylic Resin AC-1)

A polymerization vessel equipped with a stirrer, a condenser, a thermometer and a nitrogen gas inlet was purged with nitrogen and after elevating the temperature to 60° C., a solution obtained by dissolving benzyl methacrylate, diacetone acrylamide and 2-hydroxyethyl methacrylate shown in Table 3 in 100 parts of cyclohexanone and a solution obtained by dissolving 0.5 parts of 2,2'-azobisisobutyro-nitrile in 10 parts of cyclohexanone were simultaneously and uniformly added dropwise to the polymerization vessel over 2 hours. After the completion of dropwise addition, the reaction system was further heated at 60° C. for 4 hours to complete the polymerization, thereby obtaining Acrylic Resin AC-1. The hydrophilic polar group (amide group) content was 0.50 meq/g.

Synthesis Examples AC-2 to AC-7, Ac-8 and AC-9 to AC-10 (Synthesis of Acrylic Resins AC-2 to AC-7, Ac-8 and AC-9 to AC-10)

Acrylic Resins AC-2 to AC-7, Ac-8 and AC-9 to AC-10 were obtained through copolymerization and reaction performed in the same manner as in Synthesis Example AC-1 by using monomers of which kind and amount ratio (parts by mass) are shown in Table 3. The hydrophilic polar group (—$SO_3Na$, amide group, amino group, $PO(OH)_2$, COONa) content in each of Acrylic Resins AC-2 to AC-7, Ac-8 and AC-9 to AC-10 obtained is shown in Table 3.

TABLE 1

| Composition (parts by mass) | | PUA-1 | PUA-2 | PUA-3 | PUB-1 | PUB-2 | PUB-3 | PUB-4 | PUC-1 | PUc-2 |
|---|---|---|---|---|---|---|---|---|---|---|
| Polyol | Polyether A | 40.0 | | 40.0 | | | | | | |
| | Polyether B | | 40.0 | | | | | | | |
| | Polyester A | | | | 45.0 | 45.0 | 45.0 | 45.0 | | |
| | Dimer diol | | | | | | | | 15.0 | 15.0 |
| Chain Extender | HBpA | 22.0 | 22.0 | 22.0 | | | | | 35.0 | 35.0 |
| | 2-Ethyl-2-butyl-1,3-propanediol | | | | 10.0 | 10.0 | | 10.0 | | |
| | 1,6-Hexanediol | | | | | | 6.8 | | | |
| Polar group-containing diol | DEIS | 12.0 | 12.0 | 2.0 | 12.0 | 20.0 | 12.0 | 2.0 | 12.0 | 2.0 |
| Organic diisocyanate | MDI | 43.5 | 39.4 | 32.7 | 32.4 | 37.8 | 32.4 | 25.7 | 54.1 | 46.7 |
| Hydrophilic polar group | Amount of —SO$_3$Na | 0.287 | 0.297 | 0.058 | 0.339 | 0.498 | 0.350 | 0.068 | 0.290 | 0.057 |
| | introduced (meq/g) | 42000 | 28000 | 42000 | 45000 | 62000 | 38000 | 53000 | 48000 | 32000 |

HBpA: Hydrogenated bisphenol A (molecular weight: 240)
Polyether A: Polypropylene oxide adduct of bisphenol A (molecular weight: 1,000)
Polyether b: Polypropylene oxide (molecular weight: 1,000)
Polyester A: Adipic acid/neopentyl glycol = 73/52 (molecular weight: 1,000)
DEIS: Ethylene oxide adduct of sulfoisophthalic acid
MDI: 4,4'-diphenylmethane diisocyanate

TABLE 2

| Composition of Monomer Unit (parts by mass) | | PVC-1 | PVC-2 | PVC-3 |
|---|---|---|---|---|
| Vinyl chloride monomer | | 85.0 | 85.0 | 85.0 |
| Other radical polymerizable monomer | Glycidyl allyl ether | 10.0 | 10.0 | 10.0 |
| | 2-Hydroxypropyl methacrylate | 5.0 | 5.0 | 5.0 |
| | Sodium p-styrenesulfonate | 8.0 | 6.0 | 3.0 |
| Hydrophilic polar group | Amount of —SO$_3$Na introduced (meq/g) | 0.336 | 0.247 | 0.127 |
| Number average molecular weight | | 43000 | 38000 | 41000 |

TABLE 3

Composition (% by weight) and Molecular Weight of Acrylic Resin Monomer Unit

| | | Molecular Weight of Monomer | AC-1 | AC-2 | AC-3 | AC-4 | AC-5 | AC-6 | AC-7 | Ac-8 | AC-9 | AC-10 |
|---|---|---|---|---|---|---|---|---|---|---|---|---|
| (Meth)acrylate unit having aromatic ring | Benzyl methacrylate | 176 | 70.00 | 50.00 | 50.00 | 50.00 | 30.00 | 0.00 | 0.00 | 0.00 | 50.00 | 50.00 |
| | Benzyl acrylate | 162 | 0.00 | 0.00 | 0.00 | 0.00 | 0.00 | 70.00 | 0.00 | 0.00 | 0.00 | 0.00 |
| Radical polymerizable unit containing nitrogen | N,N-Dimethylaminopropyl acrylamide | 184 | 0.00 | 0.00 | 29.44 | 0.00 | 46.00 | 0.00 | 0.00 | 0.00 | 0.00 | 0.00 |
| | N,N-Isopropylacrylamide | 127 | 0.00 | 0.00 | 0.00 | 27.3 | 0.00 | 0.00 | 0.00 | 0.00 | 31.75 | 31.75 |
| | Diacetone acrylamide | 169 | 8.45 | 0.00 | 0.00 | 0.00 | 0.00 | 0.00 | 0.00 | 1.69 | 0.00 | 0.00 |
| | N-Vinylpyrrolidone | 111 | 0.00 | 25.53 | 0.00 | 0.00 | 0.00 | 0.00 | 0.00 | 0.00 | 0.00 | 0.00 |
| Others | Methyl methacrylate | 100 | 16.55 | 14.61 | 15.56 | 17.70 | 19.00 | 7.99 | 90.88 | 91.25 | 7.43 | 10.55 |

TABLE 3-continued

| | Molecular Weight of Monomer | | Composition (% by weight) and Molecular Weight of Acrylic Resin Monomer Unit Synthesis Example No. | | | | | | | | | |
|---|---|---|---|---|---|---|---|---|---|---|---|---|
| | | | AC-1 | AC-2 | AC-3 | AC-4 | AC-5 | AC-6 | AC-7 | Ac-8 | AC-9 | AC-10 |
| | 2-Hydroxymethyl methacrylate | 130 | 5.00 | 5.00 | 5.00 | 5.00 | 5.00 | 5.00 | 5.00 | 5.00 | 5.00 | 5.00 |
| | Sodium p-styrenesulfonate | 206 | 0.00 | 0.00 | 0.00 | 0.00 | 0.00 | 0.00 | 4.12 | 2.08 | 0.00 | 0.00 |
| | Sodium acrylamide-2-methyl-propanesulfonate | 243 | 0.00 | 4.86 | 0.00 | 0.00 | 0.00 | 17.01 | 0.00 | 0.00 | 0.00 | 0.00 |
| | Phosphoethyl methacrylate | 194 | 0.00 | 0.00 | 0.00 | 0.00 | 0.00 | 0.00 | 0.00 | 0.00 | 5.82 | 0.00 |
| | Sodium methacrylate | 108 | 0.00 | 0.00 | 0.00 | 0.00 | 0.00 | 0.00 | 0.00 | 0.00 | 0.00 | 2.70 |
| Polar group | Amino group (meq/g) | | 0.00 | 0.00 | 1.60 | 2.15 | 2.50 | 0.00 | 0.00 | 0.00 | 0.00 | 0.00 |
| | Amide group (meq/g) | | 0.50 | 2.50 | 1.60 | 2.15 | 2.50 | 0.70 | 0.00 | 0.10 | 2.50 | 2.50 |
| | Total of amino and amide groups (meq/g) | | 0.50 | 2.50 | 3.20 | 4.30 | 5.00 | 0.70 | 0.00 | 0.00 | 2.50 | 2.50 |
| | SO$_3$Na group (meq/g) | | 0.00 | 0.20 | 0.00 | 0.00 | 0.00 | 0.70 | 0.20 | 0.10 | 0.00 | 0.00 |
| | PO(OH)$_2$ group (meq/g) | | 0.00 | 0.00 | 0.00 | 0.00 | 0.00 | 0.00 | 0.00 | 0.00 | 0.30 | 0.00 |
| | COONa group (meq/g) | | 0.00 | 0.00 | 0.00 | 0.00 | 0.00 | 0.00 | 0.00 | 0.00 | 0.00 | 0.25 |
| Number average molecule weight | | | 96000 | 73000 | 125000 | 89000 | 125000 | 125000 | 123000 | 110000 | 148000 | 73000 |

[Preparation of Magnetic Recording Medium Sample]
Preparation of Sample 1 (Comparison)

Components in each of Magnetic Coating Material A and Nonmagnetic Coating Material a were kneaded in a kneader and dispersed using a sand mill. To the obtained dispersion solutions of Magnetic Solution A and the nonmagnetic coating material, polyisocyanate was added in an amount of 13 parts for the coating solution of a nonmagnetic layer and 4 parts for the coating solution of Magnetic Coating Material A. Furthermore, 30 parts of cyclohexanone was added to each solution. These solutions each was filtered through a filter having an average pore size of 1 μm to prepare a coating solution for forming a nonmagnetic layer and a coating solution for forming a magnetic layer.

The coating solution for a nonmagnetic layer was coated on a polyethylene terephthalate support having a thickness of 62 μm and a center plane average surface roughness of 3 nm to have a dry thickness of 1.5 μm and after drying it, the coating solution for a magnetic layer was coated thereon to a thickness of 0.1 μm. After drying, the coating was treated through calenders of 7 stages at a temperature of 90° C. and a line pressure of 300 kg/cm, then punched into 3.7 inches and subjected to a surface polishing treatment.

Preparation of Sample 2 (Invention)

Sample 2 was prepared in the same manner as Sample 1 except that Magnetic Coating Material B and Nonmagnetic Coating Material b were used in place of Magnetic Coating Material A and Nonmagnetic Coating Material a, respectively.

Preparation of Samples 3 to 5 and 22 to 39

Samples 3 to 5 and 22 to 39 were prepared in the same manner as Sample 2 except that the polyurethane resins added to the magnetic coating material and the nonmagnetic coating material were changed as shown in Tables 4 and 5. Samples 4, 24, 26, 34 and 39 are comparative samples and others are samples of the present invention.

Preparation of Samples 6 to 8

Samples 6 to 8 were prepared in the same manner as Sample 2 except that the average particle size of hexagonal barium ferrite added to the magnetic coating material was changed as shown in Table 4. Samples 6 and 7 are samples of the present invention and Sample 8 is a comparative sample.

Preparation of Samples 9 to 19

Samples 9 to 19 were prepared in the same manner as Sample 2 except that the average particle size and the amount of diamond added to the magnetic coating material were changed as shown in Table 4. Samples 9, 13 to 15 and 19 are comparative samples and others are samples of the present invention.

Preparation of Sample 20 (Invention)

Sample 20 was prepared in the same manner as Sample 5 except that the nonmagnetic coating material was changed to Nonmagnetic Coating Material a.

Preparation of Sample 21 (Invention)

Sample 21 was prepared in the same manner as Sample 5 except that the binder used in the nonmagnetic coating material was changed to PUb-4.

| (Magnetic Coating Material A) | |
|---|---|
| Hexagonal Ferrite Powder | 100 parts |
| Surface treatment: 5% by weight of $Al_2O_3$, 2% by weight of $SiO_2$ | |
| Hc: 2,500 Oe | |
| Tabular diameter: 25 nm | |
| Plate ratio: 3 | |
| σs: 56 emu/g | |
| Vinyl chloride copolymer MR110 (produced by Nippon Zeon Co., Ltd.) | 7 parts |
| Polyurethane resin UR8200 (produced by Toyobo Co., Ltd.) | 3 parts |
| α-Alumina HIT60 (produced by Sumitomo Chemical Co., Ltd.) | 4 parts |
| Diamond (average particle size: 100 nm) | 2 parts |
| Carbon black #50 (produced by Asahi Carbon Co., Ltd.) | 1 part |
| Isocetyl stearate | 5 parts |
| Stearic acid | 1 part |
| Oleic acid | 1 part |
| Methyl ethyl ketone | 80 parts |
| Cyclohexanone | 120 parts |

| (Magnetic Coating Material B) | |
|---|---|
| Hexagonal Ferrite Powder | 100 parts |
| Surface treatment: 5% by weight of $Al_2O_3$, 2% by weight of $SiO_2$ | |
| Hc: 2,500 Oe | |
| Tabular diameter: 25 nm | |
| Plate ratio: 3 | |
| σs: 56 emu/g | |
| Polyurethane Resin PUA-1 | 10 parts |
| α-Alumina HIT60 (produced by Sumitomo Chemical Co., Ltd.) | 4 parts |
| Diamond (average particle size: 100 nm) | 2 parts |
| Carbon black #50 (produced by Asahi Carbon Co., Ltd.) | 1 part |
| Isocetyl stearate | 5 parts |
| Stearic acid | 1 |
| Oleic acid | 1 part |
| Methyl ethyl ketone | 80 parts |
| Cyclohexanone | 120 parts |

| (Nonmagnetic Coating Material a) | |
|---|---|
| α-$Fe_2O_3$ hematite | 100 parts |
| Long axis length: 0.07 μm, short axis length: 0.014 μm | |
| Specific surface area by BET method: 55 $m^2$/g | |
| pH: 9 | |
| Surface treating agent: 8% by weight of $Al_2O_3$ | |
| Carbon black (average particle size: 20 nm) Conductex SC-U (produced by Columbia Carbon Co., Ltd.) | 25 parts |
| Vinyl chloride copolymer MR110 (produced by Nippon Zeon Co., Ltd.) | 15 parts |
| Polyurethane resin UR5500 (produced by Toyobo Co., Ltd.) | 7 parts |
| Phenylphosphonic acid | 4 parts |
| Isocetyl stearate | 6 parts |
| Oleic acid | 1.3 parts |
| Stearic acid | 1.3 parts |
| Methyl ethyl ketone/cyclohexanone (8/2 mixed solvent) | 250 parts |

| (Nonmagnetic Coating Material b) | |
|---|---|
| α-$Fe_2O_3$ hematite | 100 parts |
| Long axis length: 0.07 μm, short axis length: 0.014 μm | |
| Specific surface area by BET method: 55 $m^2$/g | |
| pH: 9 | |
| Surface treating agent: 8% by weight of $Al_2O_3$ | |
| Carbon black (average particle size: 20 nm) Conductex SC-U (produced by Columbia Carbon Co., Ltd.) | 25 parts |
| Polyurethane Resin PUA-1 | 22 parts |
| Phenylphosphonic acid | 4 parts |
| Isocetyl stearate | 6 parts |
| Oleic acid | 1.3 parts |
| Stearic acid | 1.3 parts |
| Methyl ethyl ketone/cyclohexanone (8/2 mixed solvent) | 250 parts |

The thus-prepared magnetic recording medium Samples 1 to 39 each was subjected to (1) measurement of S/N, (2) evaluation of running durability and (3) measurement of reduction in the output of head due to abrasion of the head by the following methods.

(1) Measurement of S/N

The measurement of S/N was performed as follows. Using a magnetic disk evaluation device Model RWA1001 (manufactured by GUZIK, U.S.A.), a spin stand LS-90 (manufactured by Kyodo Electronic System K.K.) and a metal-in-gap head having a track width of 5 μm and a gap length of 0.2 μm, signals with a linear recording density of 100 KFCI were written at a position of radius of 24.6 mm, reproduced by an MR head having a track width of 2.6 μm, then reproduction output (TAA) and noise level after DC erasure were measured, and S/N value was determined.

(2) Evaluation of Running Durability

Using a floppy disc drive (ZIP100, manufactured by Iomega, U.S.A., rotation number: 2,968 rpm), recording was performed at a recording density of 34 kfci by fixing the head at a position of radius of 38 mm. Then, the signal was reproduced and this was regarded as 100%. Thereafter, the disc was run for 1,500 hours in a thermo-cycle environment where the thermo-cycle flow shown in FIG. 1 was taken as one cycle. Output was monitored every 24 hours of running and the point when the output became 70% or less of the initial value was rated NG.

(3) Measurement of Reduction of Output of Head Due to Abrasion of Head

Using a disc evaluation device Model RWA1001 (manufactured by GUZIK, U.S.A.), a spin stand LS-90 (manufactured by Kyodo Electronic System K.K.) and an MR head with which the reproduction output of Sample 5 was previously measured, seek of the entire surface of each disc sample was performed for 1 hour. Thereafter, using an unused disc, seek was performed for 1 hour with the same head. This operation was repeated 50 times in total and the total seek time was 50 hours. With the head after seek of 50 sheets of media, the reproduction output of Sample 5 was again measured. Then, the decrement from the reproduction output before seek was calculated.

TABLE 4

| Sample No. | Magnetic Powder Tabular diameter (nm) | Diamond Average Particle Size (μm) | Diamond Amount Added (% by weight) | Binder Magnetic Layer | Binder Nonmagnetic Layer | S/N (dB) | Evaluation of Durability (hr) | Reduction of Output (dB) |
|---|---|---|---|---|---|---|---|---|
| 1 (Comparison) | 25 | 0.15 | 1.0 | MR110 + UR8200 | MR104 + UR8200 | 18 | 500 | 4.0 |
| 2 (Example) | 25 | 0.15 | 1.0 | PUA-1 | PUA-1 | 26 | 1500< | 1.0 |
| 3 (Example) | 25 | 0.15 | 1.0 | PUA-2 | PUA-2 | 26 | 1500< | 1.0 |
| 4 (Comparison) | 25 | 0.15 | 1.0 | PUa-3 | PUa-3 | 21 | 700 | 4.0 |
| 5 (Example) | 25 | 0.15 | 1.0 | PUB-1 | PUB-1 | 26 | 1500< | 1.0 |
| 6 (Example) | 5 | 0.15 | 1.0 | PUB-1 | PUB-1 | 24 | 1500< | 1.0 |
| 7 (Example) | 40 | 0.15 | 1.0 | PUB-1 | PUB-1 | 24 | 1500< | 0.5 |
| 8 (Comparison) | 50 | 0.15 | 1.0 | PUB-1 | PUB-1 | 20 | 1500< | 1.0 |
| 9 (Comparison) | 25 | 0.01 | 1.0 | PUB-1 | PUB-1 | 27 | 500 | 4.5 |
| 10 (Example) | 25 | 0.03 | 1.0 | PUB-1 | PUB-1 | 26 | 1500< | 0.5 |
| 11 (Example) | 25 | 0.25 | 1.0 | PUB-1 | PUB-1 | 25 | 1500< | 1.0 |
| 12 (Example) | 25 | 0.5 | 1.0 | PUB-1 | PUB-1 | 24 | 1500< | 1.5 |
| 13 (Comparison) | 25 | 0.6 | 1.0 | PUB-1 | PUB-1 | 20 | 700 | 5.0 |
| 14 (Comparison) | 25 | — | 0.00 | PUB-1 | PUB-1 | 28 | 50 | 6.0 |
| 15 (Comparison) | 25 | 0.15 | 0.05 | PUB-1 | PUB-1 | 27 | 30 | 5.0 |
| 16 (Example) | 25 | 0.15 | 0.10 | PUB-1 | PUB-1 | 27 | 1500 | 1.0 |
| 17 (Example) | 25 | 0.15 | 3.00 | PUB-1 | PUB-1 | 26 | 1500< | 1.0 |
| 18 (Example) | 25 | 0.15 | 5.00 | PUB-1 | PUB-1 | 25 | 1500< | 1.5 |
| 19 (Comparison) | 25 | 0.15 | 10.00 | PUB-1 | PUB-1 | 21 | 600 | 5.0 |

TABLE 5

| Sample No. | Magnetic Powder Tabular diameter (nm) | Diamond Average Particle Size (μm) | Diamond Amount Added (% by weight) | Binder Magnetic Layer | Binder Nonmagnetic Layer | S/N (dB) | Evaluation of Durability (hr) | Reduction of Output (dB) |
|---|---|---|---|---|---|---|---|---|
| 20 (Example) | 25 | 0.15 | 1.00 | PUB-1 | MR104 + UR8200 | 26 | 1500< | 1.0 |
| 21 (Example) | 25 | 0.15 | 1.0 | PUB-1 | PUB-4 | 26 | 1500< | 1.0 |
| 22 (Example) | 25 | 0.15 | 1.0 | PUB-2 | PUB-2 | 27 | 1500< | 1.0 |
| 23 (Example) | 25 | 0.15 | 1.0 | PUB-3 | PUB-3 | 26 | 1500< | 1.0 |
| 24 (Comparison) | 25 | 0.15 | 1.0 | PUb-4 | PUb-4 | 19 | 700 | 4.0 |
| 25 (Example) | 25 | 0.15 | 1.0 | PUC-1 | PUC-1 | 25 | 1500< | 0.5 |
| 26 (Comparison) | 25 | 0.15 | 1.0 | PUc-2 | PUc-2 | 18 | 600 | 4.5 |
| 27 (Example) | 25 | 0.15 | 1.0 | AC-1 | AC-1 | 24 | 1500< | 1.0 |
| 28 (Example) | 25 | 0.15 | 1.0 | AC-2 | AC-2 | 25 | 1500< | 1.0 |
| 29 (Example) | 25 | 0.15 | 1.0 | AC-3 | AC-3 | 26 | 1500< | 0.5 |
| 30 (Example) | 25 | 0.15 | 1.0 | AC-4 | AC-4 | 27 | 1500< | 1.0 |
| 31 (Example) | 25 | 0.15 | 1.0 | AC-5 | AC-5 | 27 | 1500< | 1.0 |
| 32 (Example) | 25 | 0.15 | 1.0 | AC-6 | AC-6 | 24 | 1500< | 0.5 |
| 33 (Example) | 25 | 0.15 | 1.0 | AC-7 | AC-7 | 24 | 1500< | 0.5 |
| 34 (Comparison) | 25 | 0.15 | 1.0 | Ac-8 | Ac-8 | 18 | 700 | 4.0 |
| 35 (Example) | 25 | 0.15 | 1.0 | AC-9 | AC-9 | 26 | 1500< | 1.0 |
| 36 (Example) | 25 | 0.15 | 1.0 | AC-10 | AC-10 | 27 | 1500< | 1.0 |
| 37 (Example) | 25 | 0.15 | 1.0 | PVC-1 | PVC-1 | 26 | 1500< | 0.5 |
| 38 (Example) | 25 | 0.15 | 1.0 | PVC-2 | PVC-2 | 25 | 1500< | 1.0 |
| 39 (Comparison) | 25 | 0.15 | 1.0 | PVc-3 | PVc-3 | 18 | 600 | 4.5 |

From the results shown in Tables 4 and 5, the followings are clearly seen.

The magnetic recording medium samples of the present invention have high SN ratio, excellent running durability and very small reduction of head output due to abrasion of head.

On the other hand, Comparative Samples 9, 13 to 15 and 19 where the particle size or content of diamond is out of the scope of the present invention are inferior in the running durability and undergo large reduction of output due to abrasion of head.

Comparative Samples 1, 4, 24, 26, 34 and 39 using a binder not having a specific polar group of the present invention have low SN ratio and it is considered that the dispersibility of magnetic powder is bad. Furthermore, these comparative samples are poor in the running durability and undergo large reduction of output due to abrasion of head.

Accordingly, it is verified that by specifying the polar group of the binder and the content and particle size of diamond as in the present invention, a magnetic recording medium reduced in noises and having excellent electromagnetic conversion characteristics and good running durability can be obtained.

In the magnetic recording medium of the present invention, the non-uniformity of the dispersed state of ferromagnetic hexagonal ferrite powder in the magnetic layer, which is a cause of noises on use of an MR head, is improved, the durability is elevated and the head abrasion is prevented.

That is, the magnetic recording medium of the present invention has excellent electromagnetic conversion characteristics and good running durability.

This application is based on Japanese Patent application JP 2001-330576, filed Oct. 29, 2001, the entire content of which is hereby incorporated by reference, the same as if set forth at length.

What is claimed is:

1. A magnetic recording medium comprising:

a nonmagnetic support; and at least one magnetic layer comprising a ferromagnetic hexagonal ferrite powder and a binder, wherein the magnetic layer comprises diamond particles having an average particle size of 0.03 to 0.5 µm in a ratio of 0.1 to 5% by weight to the ferromagnetic hexagonal ferrite powder, the ferrite hexagonal ferrite powder has an average tabular diameter of 5 to 40 nm, and the binder is at least one of:

(i) a binder comprising from 0.2 to 0.7 meq/g of at least one polar group selected from —$SO_3M$, —$OSO_3M$, —$PO(OM)_2$, —$OPO(OM)_2$ and —COOM, wherein M represents a hydrogen atom, an alkali metal or ammonium, and (ii) a binder comprising from 0.5 to 5 meq/g of at least one polar group selected from —$CONR_1R_2$, —$NR_1R_2$ and —$N^+R_1R_2R_3$ wherein $R_1$, $R_2$ and $R_3$ each independently represents a hydrogen atom or an alkyl group.

2. The magnetic recording medium according to claim 1, wherein the binder is a polyurethane resin obtained by reacting: a polyol having a cyclic structure and an alkylene oxide chain and having a molecular weight of from 500 to 5000; a polyol having a cyclic structure and having a molecular weight of from 200 to 500 as a chain extender; and an organic diisocyanate.

3. The magnetic recording medium according to claim 1, wherein the binder is a polyurethane resin obtained by reacting: a polyester polyol comprising an aliphatic dibasic acid and an aliphatic diol having an alkyl branched side chain and no cyclic structure; an aliphatic diol having a branched alkyl side chain and 3 or more carbon atoms as a chain extender; and an organic diisocyanate.

4. The magnetic recording medium according to claim 1, wherein the binder is a polyurethane resin obtained by reacting: a polyol compound having a cyclic structure and an alkyl chain having 2 or more carbon atoms; and an organic diisocyanate.

5. The magnetic recording medium according to claim 1, wherein the binder is a vinyl chloride-based copolymer comprising at least 75% by weight to 95% by weight of vinyl chloride monomer units.

6. The magnetic recording medium according to claim 1, wherein the binder is an acrylic copolymer comprising 1% by weight to 75% by weight of nitrogen-containing radically polymerizable monomer units, 1% by weight to 75% by weight of aromatic ring-containing radically polymerizable monomer units and other radically polymerizable monomer units so as to give the total amount of 100% by weight.

7. The magnetic recording medium according to claim 1, which is used for MR head reproduction.

8. The magnetic recording medium according to claim 1, wherein the binder (i) comprises from 0.25 to 0.6 meq/g of the at least one polar group selected from —$SO_3M$, —$OSO_3M$, —$PO(OM)_2$, —$OPO(OM)_2$ and —COOM, and the binder (ii) comprises from 1 to 4 meq/g of the at least one polar group selected from —$CONR_1R_2$, —$NR_1R_2$ and —$N^+R_1R_2R_3$.

9. The magnetic recording medium according to claim 1, wherein the binder (i) comprises from 0.3 to 0.5 meq/g of the at least one polar group selected from —$SO_3M$, —$OSO_3M$, —$PO(OM)_2$, —$OPO(OM)_2$ and —COOM, and the binder (ii) comprises from 1.5 to 3.5 meq/g of the at least one polar group selected from —$CONR_1R_2$, —$NR_1R_2$ and —$N^+R_1R_2R_3$.

* * * * *